US012498129B2

(12) United States Patent
Furuya et al.

(10) Patent No.: US 12,498,129 B2
(45) Date of Patent: Dec. 16, 2025

(54) RISK INFORMATION PROVISION DEVICE, RISK INFORMATION PROVISION SYSTEM, RISK INFORMATION PROVISION METHOD, AND COMPUTER-READABLE MEDIUM

(71) Applicant: Asahi Kasei Microdevices Corporation, Tokyo (JP)

(72) Inventors: Takaaki Furuya, Tokyo (JP); Keiichiro Kuwata, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 518 days.

(21) Appl. No.: 17/693,407

(22) Filed: Mar. 13, 2022

(65) Prior Publication Data

US 2022/0307709 A1    Sep. 29, 2022

(30) Foreign Application Priority Data

Mar. 26, 2021   (JP) .................................. 2021-054059
Mar. 11, 2022   (JP) .................................. 2022-037740

(51) Int. Cl.
*F24F 11/00*   (2018.01)
*F24F 110/70*   (2018.01)
*G01N 33/00*   (2006.01)

(52) U.S. Cl.
CPC ........ *F24F 11/0001* (2013.01); *G01N 33/004* (2013.01); *F24F 2110/70* (2018.01)

(58) Field of Classification Search
CPC ............. F24F 11/0001; F24F 2110/70; G01N 33/004; G01N 33/0062; G01N 33/0063;
(Continued)

(56) References Cited

U.S. PATENT DOCUMENTS 6,073,455 A      6/2000  Masako
9,182,751 B1 *  11/2015  Reeder ................. G08B 21/182
(Continued)

FOREIGN PATENT DOCUMENTS

CN         1719137 A     1/2006
CN       104390310 A     3/2015
(Continued)

OTHER PUBLICATIONS

Office Action issued for related Chinese Application 202210307504.2, issued by The State Intellectual Property Office of People's Republic of China on Jun. 13, 2023.
(Continued)

*Primary Examiner* — Yuhui R Pan

(57) ABSTRACT

A risk information provision device is provided, comprising: an information acquisition unit for acquiring risk information related to a risk depending on a status of a carbon dioxide concentration in a determination target and risk handling information for handling the risk, wherein the status of the carbon dioxide concentration is determined based on a temporal change in the carbon dioxide concentration in the determination target; and a provision unit for providing at least one of the risk information or the risk handling information, wherein the risk handling information includes recipient information related to a recipient to which the risk information is provided, and the provision unit is configured to provide the risk information to the recipient.

20 Claims, 15 Drawing Sheets

(58) Field of Classification Search
CPC ......... G01B 11/02; G01S 17/08; G01S 19/14; G06Q 10/0635
See application file for complete search history.

(56) References Cited

U.S. PATENT DOCUMENTS

| | | |
|---|---|---|
| 10,002,523 B2 | 6/2018 | Fadell |
| 10,217,068 B1 | 2/2019 | Davis |
| 11,342,051 B1 | 5/2022 | Jain |
| 11,649,977 B2 | 5/2023 | Chuan |
| 11,913,654 B1 | 2/2024 | Stamatakis |
| 2004/0236240 A1 | 11/2004 | Kraus |
| 2006/0114113 A1 | 6/2006 | Yokosawa |
| 2006/0122738 A1 | 6/2006 | Yamada |
| 2007/0043576 A1* | 2/2007 | Kumamoto ........ G06Q 30/0283 705/400 |
| 2008/0250661 A1 | 10/2008 | Kou |
| 2010/0014626 A1 | 1/2010 | Fennell |
| 2010/0292860 A1 | 11/2010 | Komiya |
| 2012/0197462 A1 | 8/2012 | Sakai |
| 2013/0098597 A1 | 4/2013 | Fujimoto |
| 2013/0210351 A1 | 8/2013 | Ling |
| 2014/0324527 A1 | 10/2014 | Kulkarni |
| 2016/0018124 A1 | 1/2016 | Yamamoto |
| 2016/0178229 A1 | 6/2016 | Chen |
| 2017/0003258 A1 | 1/2017 | Krauss |
| 2017/0176187 A1 | 6/2017 | Ishihama |
| 2017/0208493 A1 | 7/2017 | Masson |
| 2017/0248564 A1 | 8/2017 | Miyajima |
| 2017/0254737 A1 | 9/2017 | Ke |
| 2017/0336343 A1 | 11/2017 | Bhat |
| 2017/0367618 A1 | 12/2017 | Ricciardelli |
| 2018/0128511 A1 | 5/2018 | Motodani |
| 2018/0195752 A1 | 7/2018 | Sasaki |
| 2019/0072291 A1 | 3/2019 | Kamijo |
| 2019/0086877 A1 | 3/2019 | Norton |
| 2019/0122759 A1 | 4/2019 | Wakimoto |
| 2019/0170384 A1 | 6/2019 | McQuade et al. |
| 2019/0244507 A1 | 8/2019 | Uruno |
| 2019/0264940 A1 | 8/2019 | Lee |
| 2020/0049361 A1 | 2/2020 | Minamida |
| 2020/0124306 A1 | 4/2020 | Kowald |
| 2020/0187357 A1* | 6/2020 | Park ................... G01N 15/1459 |
| 2020/0227159 A1 | 7/2020 | Boisvert |
| 2020/0248919 A1 | 8/2020 | Green et al. |
| 2020/0315548 A1 | 10/2020 | Sato |
| 2020/0348038 A1 | 11/2020 | Risbeck |
| 2020/0383172 A1 | 12/2020 | McCracken |
| 2020/0393159 A1 | 12/2020 | Takayanagi |
| 2020/0401092 A1 | 12/2020 | Gervais |
| 2021/0018210 A1* | 1/2021 | Nasis ..................... F24F 11/65 |
| 2021/0043330 A1 | 2/2021 | Hiroko |
| 2021/0053413 A1 | 2/2021 | Noh |
| 2021/0072713 A1 | 3/2021 | Matsumoto |
| 2021/0094686 A1 | 4/2021 | Metzner |
| 2021/0110704 A1 | 4/2021 | Hanko |
| 2021/0164678 A1 | 6/2021 | Delgoshaei |
| 2021/0222901 A1 | 7/2021 | Scaramelli |
| 2021/0247086 A1 | 8/2021 | Sasaki |
| 2021/0409396 A1 | 12/2021 | Funayama |
| 2022/0003581 A1 | 1/2022 | Fox |
| 2022/0005609 A1 | 1/2022 | Morizumi |
| 2022/0040356 A1 | 2/2022 | Ichihara |
| 2022/0128253 A1 | 4/2022 | Suzuki |
| 2022/0128428 A1 | 4/2022 | Clark |
| 2022/0146482 A1 | 5/2022 | Fuerst |
| 2022/0203804 A1 | 6/2022 | Shimomura |
| 2022/0268492 A1 | 8/2022 | Yajima |
| 2022/0288520 A1 | 9/2022 | Suzuki |
| 2022/0399105 A1 | 12/2022 | Wagner Block |
| 2022/0404048 A1 | 12/2022 | Delgoshaei |
| 2023/0182766 A1 | 6/2023 | Chou |
| 2023/0235907 A1 | 7/2023 | Dewald et al. |
| 2023/0272928 A1 | 8/2023 | Livchak |
| 2024/0011658 A1 | 1/2024 | Tsuruzono |
| 2024/0060667 A1 | 2/2024 | Minami |

FOREIGN PATENT DOCUMENTS

| | | |
|---|---|---|
| CN | 106325067 A | 1/2017 |
| CN | 106384482 A * | 2/2017 |
| CN | 108549307 A | 9/2018 |
| CN | 109812938 A | 5/2019 |
| CN | 110044007 A1 | 7/2019 |
| CN | 110887166 A | 3/2020 |
| CN | 110887807 A | 3/2020 |
| CN | 111523750 A | 8/2020 |
| DE | 202011105211 U1 | 11/2011 |
| EP | 2119965 A1 | 11/2009 |
| EP | 3751209 A1 | 12/2020 |
| JP | 2002056467 A | 2/2002 |
| JP | 2002169935 A | 6/2002 |
| JP | 2004108857 A | 4/2004 |
| JP | 2004196063 A | 7/2004 |
| JP | 2005056330 A | 3/2005 |
| JP | 2005147563 A | 6/2005 |
| JP | 2006064494 A | 3/2006 |
| JP | 2007213470 A | 8/2007 |
| JP | 2008052608 A | 3/2008 |
| JP | 2008304124 A | 12/2008 |
| JP | 2009230485 A | 10/2009 |
| JP | 2010093616 A | 4/2010 |
| JP | 2010121953 A | 6/2010 |
| JP | 2011158115 A | 8/2011 |
| JP | 2011162096 A | 8/2011 |
| JP | 2012008713 A | 1/2012 |
| JP | 2012128469 A | 7/2012 |
| JP | 2013047579 A | 3/2013 |
| JP | 2014228518 A | 12/2014 |
| JP | 2015018517 A | 1/2015 |
| JP | 5835734 B2 | 12/2015 |
| JP | 2016031382 A | 3/2016 |
| JP | 2016081090 A1 | 5/2016 |
| JP | 2016195639 A | 11/2016 |
| JP | 2017048962 A | 3/2017 |
| JP | 2017053509 A | 3/2017 |
| JP | 2017151698 A | 8/2017 |
| JP | 2017203581 A | 11/2017 |
| JP | 2018017403 A | 2/2018 |
| JP | 2018048749 A | 3/2018 |
| JP | 2018120468 A | 8/2018 |
| JP | 2018206005 A | 12/2018 |
| JP | 2018206302 A | 12/2018 |
| JP | 6557853 B2 | 8/2019 |
| JP | 2020024586 A | 2/2020 |
| JP | 2020067939 A | 4/2020 |
| JP | 2020071621 A | 5/2020 |
| JP | 2020144628 A | 9/2020 |
| JP | 2020154976 A | 9/2020 |
| JP | 2021081171 A | 5/2021 |
| JP | 3232288 U | 6/2021 |
| JP | 2021196093 A | 12/2021 |
| JP | 7217824 B1 | 2/2023 |
| JP | 2023137792 A | 9/2023 |
| KR | 20160104940 A | 9/2016 |
| KR | 20200060865 A | 6/2020 |
| KR | 20200105093 A | 9/2020 |
| KR | 20210012797 A | 2/2021 |
| WO | 2007057966 A1 | 5/2007 |
| WO | 2015151363 A1 | 10/2015 |
| WO | 2017135628 A1 | 8/2017 |
| WO | 2018061147 A1 | 4/2018 |
| WO | 2019130452 A1 | 7/2019 |
| WO | 2020144247 A1 | 7/2020 |
| WO | 2020153151 A1 | 7/2020 |
| WO | 2020217616 A1 | 10/2020 |
| WO | 2022065066 A1 | 3/2022 |

OTHER PUBLICATIONS

Guanzhong, "Construction and management of computer room", Shaanxi Science and Technology Publishing, pp. 553-554, Jun. 30, 1993 See citation in Non-Patent Literature #1.

* cited by examiner

RISK INFORMATION PROVISION DEVICE, RISK INFORMATION PROVISION SYSTEM, RISK INFORMATION PROVISION METHOD, AND COMPUTER-READABLE MEDIUM

The contents of the following Japanese patent application(s) are incorporated herein by reference:
NO. 2021-054059 filed in JP on Mar. 26, 2021
NO. 2022-037740 filed in JP on Mar. 11, 2022

BACKGROUND

1. Technical Field

The present invention relates to a risk information provision device, a risk information provision system, a risk information provision method, and a computer-readable medium.

2. Related Art

Patent Document 1 describes that the carbon dioxide concentration within the target facility and the living body signal of a target person in the bedroom are acquired from a carbon dioxide sensor installed in the target facility and a living body sensor installed in the bedroom within the target facility, respectively (paragraph 0006).

PRIOR ART DOCUMENT

Patent Document

Patent Document 1 Japanese Patent Application Publication No. 2020-071621

SUMMARY

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

Figure 1:
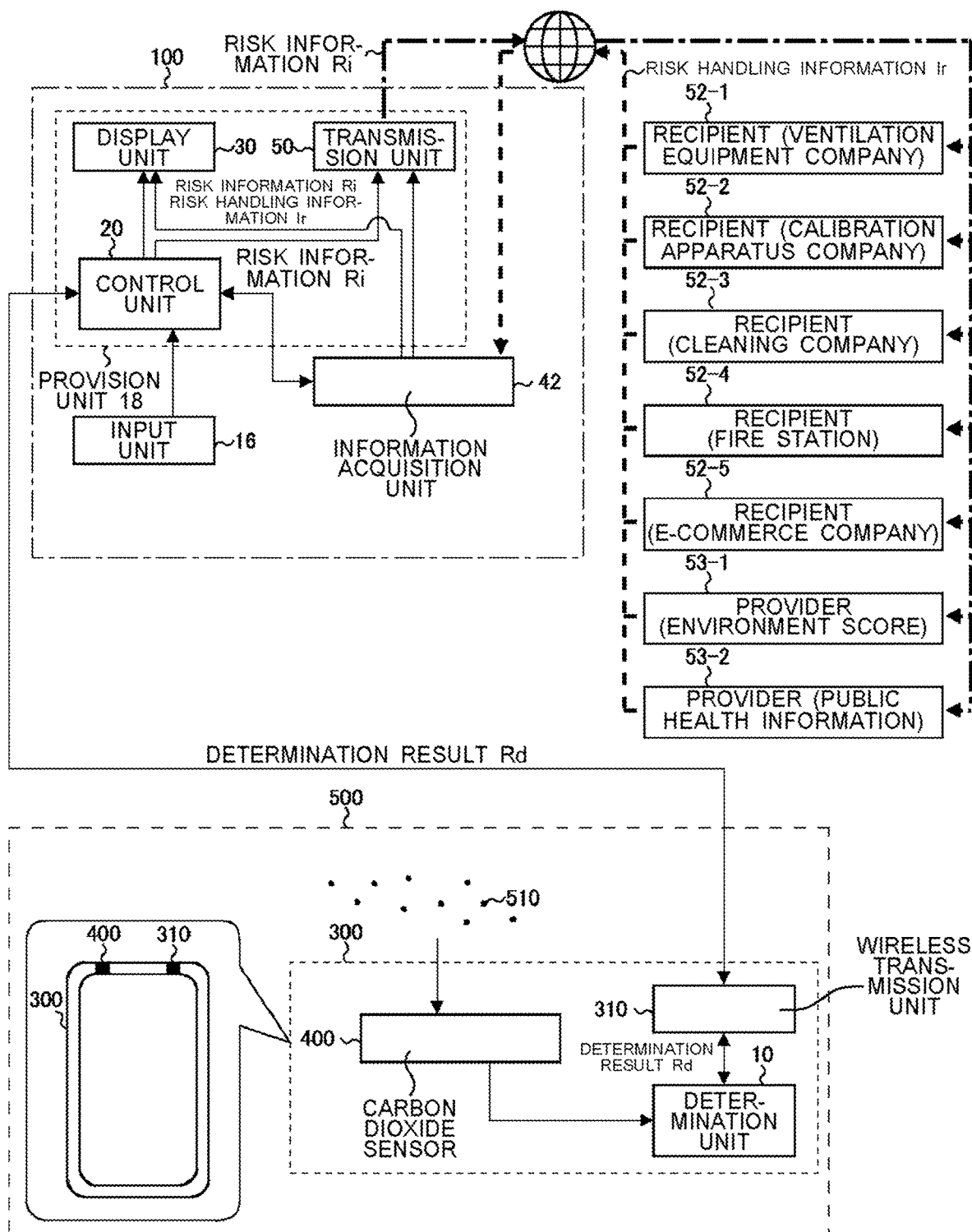
FIG. 1 is a block diagram showing one example of a risk information provision system 200 according to one embodiment of the present invention.

FIG. 1 is a block diagram showing one example of the risk information provision system 200 according to one embodiment of the present invention. The risk information provision system 200 includes a risk information provision device 100 and a mobile terminal 300. The mobile terminal 300 includes a carbon dioxide ($CO_2$) sensor 400. The mobile terminal 300 is, for example, a smartphone, a tablet, a head mounted display (HMD), a wearable device, or the like. The wearable device refers to a computer worn on a part of a living body such as an arm, a leg, a head or the like. The wearable device is, for example, a smart watch.

The carbon dioxide ($CO_2$) sensor 400 measures the concentration of carbon dioxide ($CO_2$) in a determination target 500. The determination target 500 is an object that is the target of determination for the concentration of carbon dioxide ($CO_2$). The object is, for example, an indoor room. The object may be a given outdoor space. The carbon dioxide ($CO_2$) sensor 400 measures the concentration of carbon dioxide ($CO_2$) 510 included in the air present in the object.

If the determination target 500 is an indoor room, the mobile terminal 300 may be placed inside the room. If the determination target 500 is an indoor room, the risk information provision device 100 may be placed inside the room or may be placed outside the room.

The status of the concentration of carbon dioxide ($CO_2$) 510 in the determination target 500 is referred to as the status Sd. The status Sd is determined based on the temporal change in the concentration of carbon dioxide ($CO_2$) 510 in the determination target 500. The status Sd refers to a degree of change in the concentration of carbon dioxide ($CO_2$) 510 in the determination target 500. The status Sd refers to, for example, whether the degree of change in the concentration of carbon dioxide ($CO_2$) 510 in the determination target 500 is normal, whether the concentration of carbon dioxide ($CO_2$) 510 is rapidly changing in the determination target 500, whether it is rapidly approaching an abnormal value, or the like. The determination result for the determined status Sd is referred to as a determination result Rd.

In this example, the mobile terminal 300 includes a determination unit 10. In this example, the determination unit 10 determines the status Sd of the carbon dioxide ($CO_2$) concentration in the determination target 500 based on the temporal change in the carbon dioxide ($CO_2$) concentration in the determination target 500. The determination unit 10 may output the determination result Rd. The determination unit 10 may be a central processing unit (CPU).

In this example, the mobile terminal 300 includes a wireless transmission unit 310. In this example, the wireless transmission unit 310 transmits the determination result Rd, which is from the determination unit 10, to the risk information provision device 100.

The risk information provision device 100 includes an information acquisition unit 42 and a provision unit 18. The information acquisition unit 42 acquires risk information and risk handling information. The risk information is referred to as risk information Ri and the risk handling information is referred to as risk handling information Ir. The information acquisition unit 42 may acquire the determination result Rd.

The risk information Ri is the information related to a risk depending on the status Sd of the concentration of carbon dioxide ($CO_2$) 510 in the determination target 500. For example, the information related to a risk refers to the information such as whether the concentration of the carbon dioxide ($CO_2$) 510 is rapidly changing in the determination target 500, whether it is rapidly approaching an abnormal value, or the like.

The risk handling information Ir is the information for handling a risk depending on the status Sd. For example, the information for handling a risk refers to the information for prompting a user of the risk information provision device 100 to do an action for handling the risk, the information of the laws related to the public health of carbon dioxide ($CO_2$) and the like, the information of the environment score related to carbon dioxide ($CO_2$) and the like, the advertisement information of an ventilation company for solving an abnormal value in a case where the concentration of carbon dioxide ($CO_2$) 510 in the determination target 500 is approaching the abnormal value, and the like. The risk handling information Ir may include the information for reducing the risk. The information acquisition unit 42 may acquire the risk handling information Ir via the Internet line.

The provision unit 18 provides at least one of the risk information Ri or the risk handling information Ir. In this example, the provision unit 18 includes a control unit 20, a display unit 30, and a transmission unit 50. The control unit 20 may be a central processing unit (CPU). In this example, the display unit 30 displays at least one of the risk information Ri or the risk handling information Ir. The display unit 30 may display at least one of the risk information Ri or the risk handling information Ir in a form that can be visually recognized by a human. The display unit 30 is, for example, a display, a monitor, and the like. The risk information provision device 100 may be a computer including the CPU, the display, a memory, an interface, and the like. The risk information provision device 100 may be a portable computer such as a tablet.

The control unit 20 may control the display unit 30 so that the display unit 30 displays at least one of the risk information Ri or the risk handling information Ir. In this example, the provision unit 18 causes the display unit 30 to display at least one of the risk information Ri or the risk handling information Ir to provide at least one of the risk information Ri or the risk handling information Ir to the user of the risk information provision device 100. In this way, the user of the risk information provision device 100 can know at least one of the risk information Ri or the risk handling information Ir.

The control unit 20 may control the transmission unit 50 so that the transmission unit 50 transmits the risk information Ri. In this example, the provision unit 18 causes the transmission unit 50 to transmit the risk information Ri to provide the risk information Ri to the recipient of the risk information Ri. The recipient of the risk information Ri is referred to as a recipient 52. The recipient 52 may be a third party that is not the owner of the risk information provision device 100. The provision unit 18 may wirelessly provide the risk information Ri to the recipient 52 via, for example, the Internet line. The provision unit 18 may provide the risk information Ri to a plurality of recipients 52. In this way, the recipient 52 can know the risk information Ri.

In this example, the recipient 52-1 is a ventilation equipment company, the recipient 52-2 is a calibration apparatus company, the recipient 52-3 is a cleaning company, the recipient 52-4 is a fire station, and the recipient 52-5 is an electronic commerce company. For example, the ventilation equipment company is a manufacturer of air conditioning equipment (an air conditioner). If the determination target 500 is an indoor room, the cleaning company is, for example, a cleaning company of a duct for releasing the indoor air to the outdoor. The electronic commerce company is, for example, a company selling goods through the Internet. These recipients are merely examples. The recipient 52 may be, for example, a company operating an application such as air quality management, or may be an insurance company.

In this example, the provider of the risk handling information Ir is referred to as a provider 53. The provider of the risk handling information Ir refers to the provider who provides the risk handling information Ir. The information acquisition unit 42 may acquire the risk handling information Ir provided by the provider 53. The information acquisition unit 42 may acquire pieces of the risk handling information Ir provided by a plurality of providers 53. In this example, the provider 53-1 is the provider of the environment score, and the provider 53-2 is the provider of the public health information. In this example, the recipient 52 also provides the risk handling information Ir.

The provision unit 18 may provide the risk information Ri to the recipient 52 and the provider 53. The information acquisition unit 42 may acquire the risk handling information Ir provided by the provider 53 and the recipient 52.

The risk information provision device 100 may further include the input unit 16. The input unit 16 is, for example, a mouse, a keyboard, and the like.

The risk handling information Ir may include the recipient information related to the recipient 52. The recipient information is referred to as recipient information Isp. The recipient information Isp is, for example, the information indicating that the recipient 52-1 is the ventilation equipment company.

In the case where the handling of the risk based on risk handling information Ir is input by the input unit 16, the provision unit 18 may provide the risk information Ri to at least one of the recipient 52 or the provider 53. The case where the handling of the risk based on risk handling information Ir is input by the input unit 16 may be the case where the user of the risk information provision device 100 inputs the handling of the risk through the input unit 16, or may be the case where an electronic apparatus that is in communication with the risk information provision device 100 automatically inputs the handling of the risk.

The risk information provision device 100 may include a display unit 30 having an input function instead of the input unit 16. The display unit 30 is, for example, a touch panel. If the display unit 30 is a touch panel, the user of the risk information provision device 100 may input the handling of the risk via the display unit 30. The display unit 30 may display a plurality of recipients 52. If the display unit 30 displays a plurality of recipients 52, the plurality of recipients 52 may be given priority for the order of display, the size of the display, or the like. For example, the order in which the companies are displayed may be changed for each of the concentration zones of carbon dioxide, or particular companies may be preferentially displayed on the top.

Inputting the handling of the risk based on the risk handling information Ir refers to, in a case where the risk handling information Ir is the advertisement information provided by the recipient 52-1 (a ventilation equipment company), inputting the request for ventilation to the recipient 52-1 in order to solve the risk (for example, an abnormal value of carbon dioxide ($CO_2$) concentration). Inputting the handling of the risk based on the risk handling information Ir refers to, in a case where the risk handling information Ir is the provider 53-1 (the provider of the environment score related to carbon dioxide ($CO_2$)), inputting the request for ventilation to the recipient 52-1 or inputting the request for cleaning to the recipient 52-3 in order to improve the environment score.

The additional risk information related to the risk in the determination target 500 and related to the risk depending on the status Sd is referred to as additional risk information Ria. The status Sd is the status of the concentration of carbon dioxide ($CO_2$) 510 in the determination target 500, as described above.

As described above, the status Sd is determined based on the temporal change in the concentration of carbon dioxide ($CO_2$) 510 in the determination target 500. The additional risk information Ria may be the risk information realized by the user of the risk information provision device 100 besides the status Sd determined based on the temporal change in the concentration of carbon dioxide ($CO_2$) 510. In a case where the user recognizes that the stove is burning more intensely than usual in the determination target 500, the risk information is, for example, the information indicating that the stove is burning more intensely than usual.

The additional risk handling information related to the handling of the risk in the determination target 500 and related to the handling of the risk depending on the status Sd is referred to as additional risk handling information Ira. The additional risk handling information Ira may be the risk handling information realized by the user of the risk information provision device 100 besides the risk handling information Ir acquired by the information acquisition unit 42. In a case where the display unit 30 only displays the advertisement information of the recipient 52-1 (the ventilation equipment company) although the user recognizes that the stove is burning more intensely than usual in the determination target 500, the risk handling information is, for example, the information indicating that the risk information Ri should be provided also to the recipient 52-4 (the fire station).

In a case where the input unit 16 inputs at least one of the additional risk information Ria or the additional risk handling information Ira, the provision unit 18 may provide at least one of the risk information Ri or the risk handling information Ir based on at least one of the additional risk information Ria or the additional risk handling information Ira. In a case where the input unit 16 inputs at least one of the additional risk information Ria or the additional risk handling information Ira, the control unit 20 may control the display unit 30 so that the display unit 30 displays at least one of the risk information Ri or the risk handling information Ir based on at least one of the additional risk information Ria or the additional risk handling information Ira.

Figure 2:
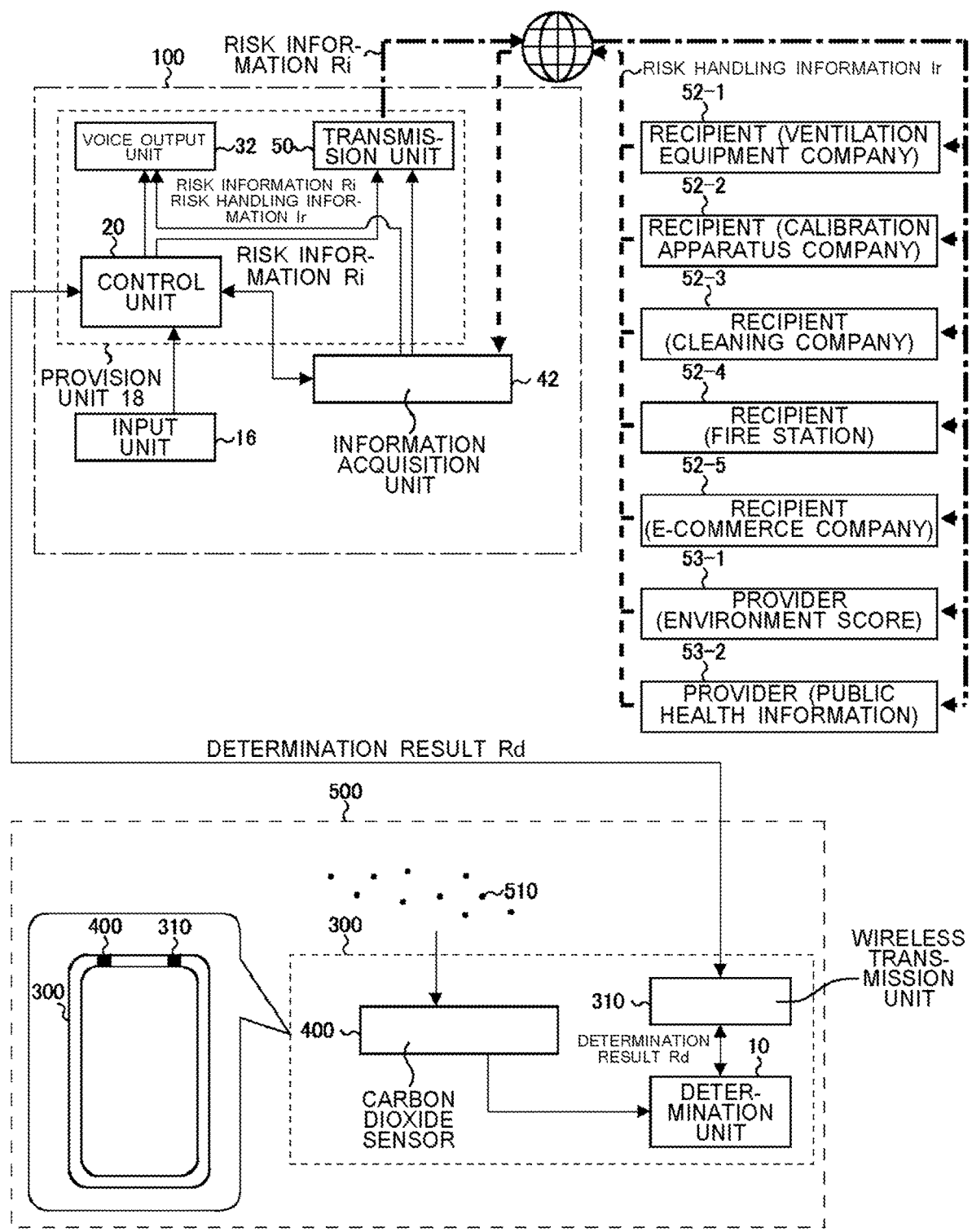
FIG. 2 is a block diagram showing another one example of the risk information provision system 200 according to one embodiment of the present invention.

FIG. 2 is a block diagram showing another one example of the risk information provision system 200 according to one embodiment of the present invention. In this example, the provision unit 18 includes a voice output unit 32 instead of the display unit 30. The risk information provision system 200 in this example is different from the risk information provision system 200 shown in FIG. 1 in these respects. In this example, the voice output unit 32 outputs the voice according to at least one of the risk information Ri or the risk handling information Ir. The voice output unit 32 may output at least one of the risk information Ri or the risk handling information Ir in a form that can be aurally recognized by a human. The voice output unit 32 is, for example, a speaker.

The control unit 20 may control the voice output unit 32 so that the voice output unit 32 outputs the voice according to at least one of the risk information Ri or the risk handling information Ir. In this example, the provision unit 18 causes the voice output unit 32 to output the voice according to at least one of the risk information Ri and the risk handling information Ir to provide at least one of the risk information Ri or the risk handling information Ir to the user of the risk information provision device 100. In this way, the user of the risk information provision device 100 can know at least one of the risk information Ri or the risk handling information Ir. The voice according to at least one of the risk information Ri or the risk handling information Ir is, for example, the voice indicating that the concentration of the carbon dioxide ($CO_2$) 510 in the determination target 500 is an abnormal value.

Figure 3:
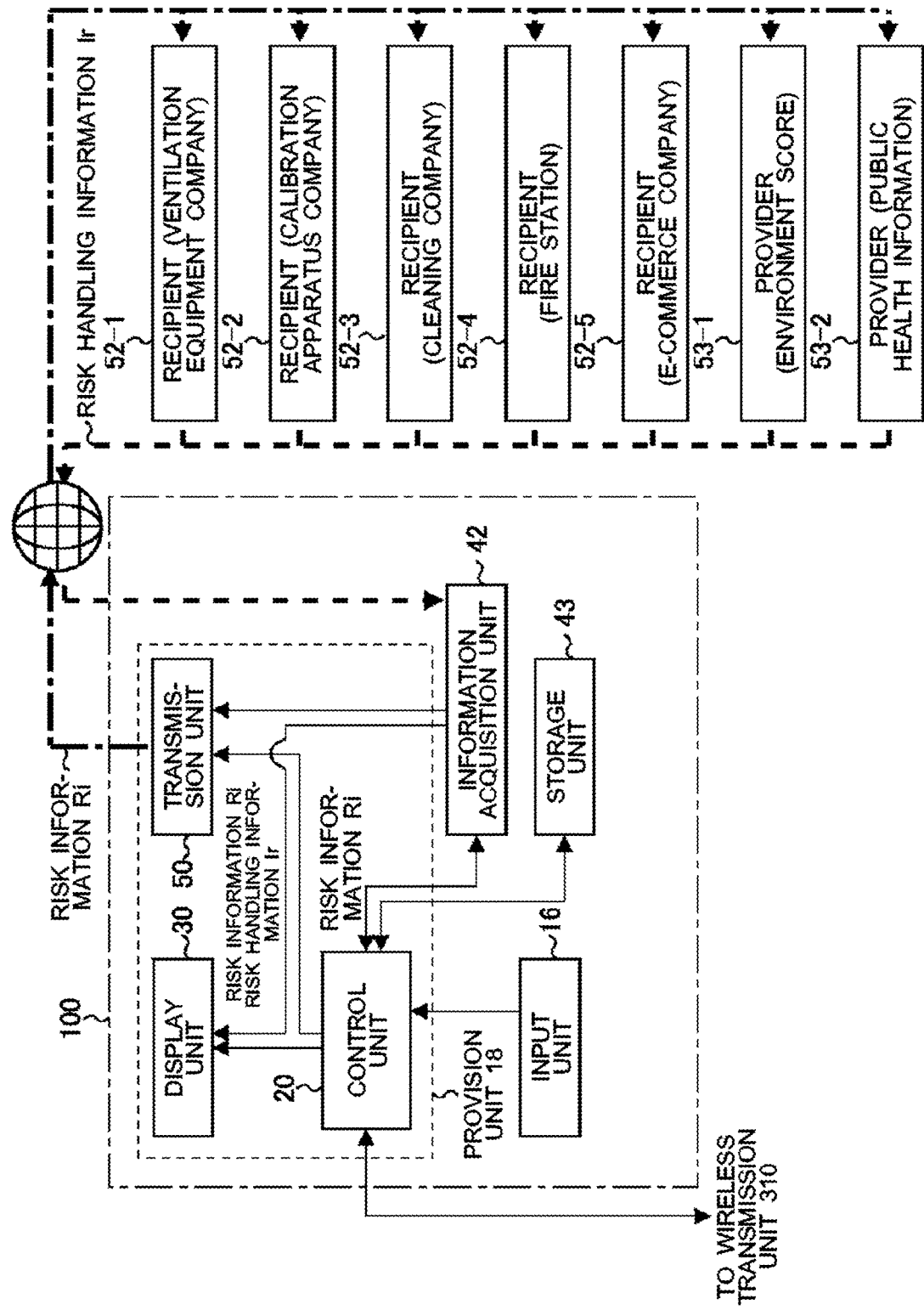
FIG. 3 is a block diagram showing another one example of the risk information provision system 200 according to one embodiment of the present invention.

FIG. 3 is a block diagram showing another one example of the risk information provision system 200 according to one embodiment of present invention. In this example, the risk information provision device 100 further includes a storage unit 43. The risk information provision system 200 in this example is different from the risk information provision system 200 shown in FIG. 1 in these respects. However, in FIG. 3, the determination target 500 and the mobile terminal 300 shown in FIG. 1 are not shown.

In this example, the storage unit 43 stores the provision history of the risk information Ri and the risk handling information Ir that are provided by the provision unit 18. The provision unit 18 may provide at least one of the risk information Ri or the risk handling information Ir based on the provision history of the risk information Ri and the risk handling information Ir which is stored in the storage unit 43.

The risk information provision device 100 may not include the storage unit 43. If the risk information provision device 100 includes no storage unit 43, the provision history of the risk information Ri and the risk handling information Ir that are provided by the provision unit 18 may be stored in a cloud server or a server placed outside the risk information provision device 100.

The provision history of the risk information Ri includes the information related to the risk depending on the status Sd of the concentration of carbon dioxide ($CO_2$) 510 (see FIG. 1) in the determination target 500, and the history of the information indicating which of the recipient 52 or the provider 53 has been provided with the risk information Ri. The provision history of the risk handling information Ir includes the information for handling the risk depending on the status Sd and the information indicating which of the recipient 52 or the provider 53 has provided the risk handling information Ir. Therefore, by providing the risk handling information Ir based on the provision history of the risk information Ri and the risk handling information Ir, the provision unit 18 can provide the risk handling information Ir having a high probability of being most appropriate. The provision unit 18 provides the risk information Ri based on the provision history so that the provision unit 18 can provide the risk information Ri having a high probability of being most appropriate.

The risk handling information Ir may include the information related to the apparatus for handling the risk. The apparatus is referred to as apparatus Ap. The apparatus Ap for handling the risk is, for example, in a case where the concentration of carbon dioxide ($CO_2$) 510 (see FIG. 1) in the determination target 500 is approaching an abnormal value, a ventilation apparatus for solving the abnormal value.

The information acquisition unit 42 may further acquire the information related to the apparatus Ap and provided by the recipient 52. The storage unit 43 may further store the acquisition history of the information related to the apparatus Ap and acquired by the information acquisition unit 42. The provision unit 18 may provide at least one of the risk information Ri or the risk handling information Ir based on the acquisition history of the information related to the apparatus Ap which is stored in the storage unit 43.

The acquisition history of the information related to the apparatus Ap is likely to reflect the acquisition tendency of the apparatus Ap by the user of the risk information provision device 100. The acquisition history is likely to include the purchase history of the apparatus Ap of the user. Therefore, the provision unit 18 provides the risk handling information Ir based on the acquisition history of the information related to the apparatus Ap, so that the provision unit 18 can provide the risk handling information Ir having a high probability of being most appropriate. By providing the risk information Ri based on the acquisition history, the provision unit 18 can provide the risk information Ri having a high probability of being most appropriate.

The storage unit 43 may further store the browsing history of the information related to the apparatus Ap and acquired by the information acquisition unit 42. The browsing history is the history of the user of the risk information provision device 100 browsing, through the display unit 30, the information related to the apparatus Ap and displayed on the display unit 30. The browsing history is also likely to reflect the acquisition tendency of the apparatus Ap by the user of the risk information provision device 100. The provision unit 18 may also provide at least one of the risk information Ri or the risk handling information Ir based on the browsing history of the information related to the apparatus Ap which is stored in the storage unit 43.

Figure 4:
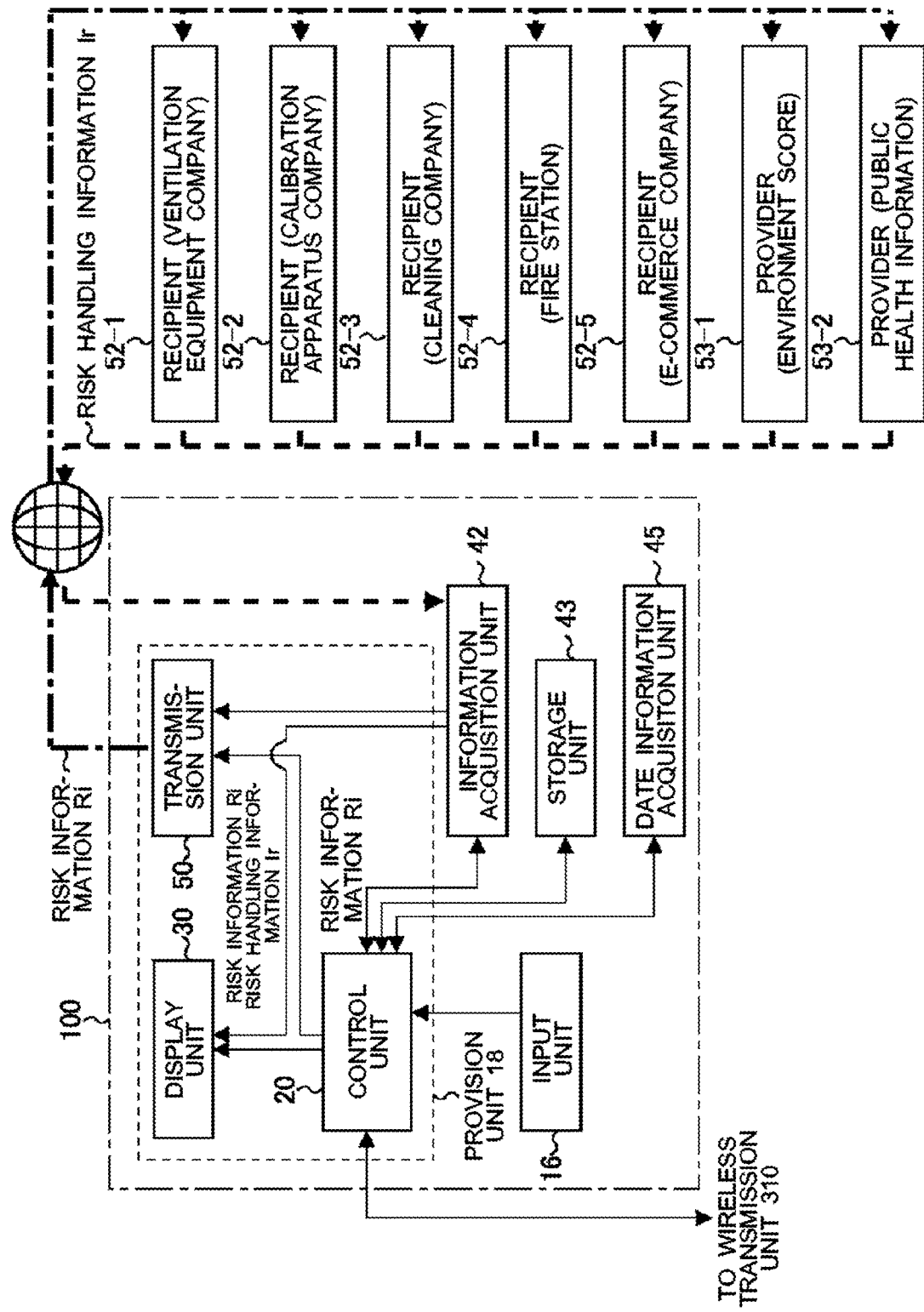
FIG. 4 is a block diagram showing another one example of the risk information provision system 200 according to one embodiment of the present invention.

FIG. 4 is a block diagram showing another one example of the risk information provision system 200 according to one embodiment of the present invention. In this example, the risk information provision device 100 further includes a date information acquisition unit 45. The risk information provision system 200 in this example is different from the risk information provision system 200 shown in FIG. 3 in this respect.

The date information acquisition unit 45 acquires the date information of the date on which at least one of the risk information Ri or the risk handling information Ir is acquired. The date information is referred to as date information Id. The date information Id is, for example, the year and date on which at least one of the risk information Ri or the risk handling information Ir is acquired.

The information acquisition unit 42 may acquire the risk information Ri and the risk handling information Ir based on the date information Id acquired by the date information acquisition unit 45. The date information Id may reflect the purchasing trends of the apparatus Ap by the user of the risk information provision device 100. The case where the date information Id reflects the purchasing trends by the user is, for example, the case where the date information Id reflects the seasonal characteristics of the purchasing trends by the user. For example, in March, the apparatus Ap related to a new life, intended for a new life in the following fiscal year, is likely to be purchased.

The provision unit 18 may provide the risk information Ri and the risk handling information Ir based on the date information Id acquired by the date information acquisition unit 45. The control unit 20 may control the display unit 30 based on the date information Id so that the display unit 30 displays the risk information Ri and the risk handling information Ir. In this way, the display unit 30 is likely to display the risk information Ri and the risk handling information Ir reflecting the purchasing trends (for example, the seasonal characteristics) of the apparatus Ap by the user of the risk information provision device 100.

The storage unit 43 may store the date information Id acquired by the date information acquisition unit 45 therein. The provision unit 18 may provide at least one of the risk information Ri or the risk handling information Ir based on the date information Id stored in the storage unit 43.

The date information Id is likely to reflect the acquisition tendency of at least one of the risk information Ri or the risk handling information Ir by the user of the risk information provision device 100. The acquisition tendency is, for example, a purchase history of the apparatus Ap by the user from the recipient 52-5 (an electronic commerce company). Therefore, the provision unit 18 provides the risk information Ri based on the date information Id so that the provision unit 18 can provide the risk information Ri to the recipient 52 or the provider 53 that is most appropriate for the user.

Figure 5:
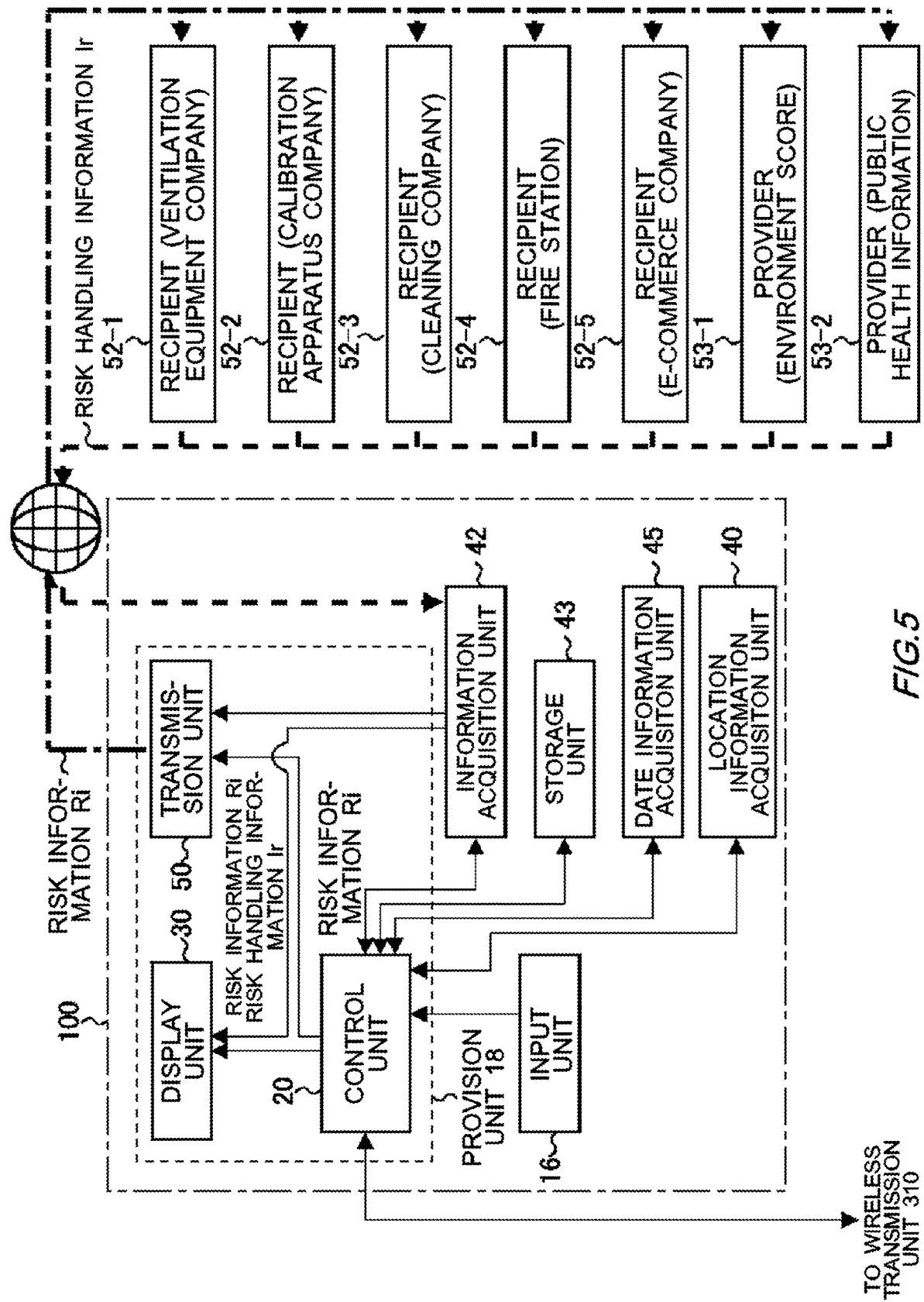
FIG. 5 is a block diagram showing another one example of the risk information provision system 200 according to one embodiment of the present invention.

FIG. 5 is a block diagram showing another one example of the risk information provision system 200 according to one embodiment of the present invention. In this example, the risk information provision device 100 further includes the location information acquisition unit 40. The risk information provision system 200 in this example is different from the risk information provision system 200 shown in FIG. 4 in these respects.

The location information acquisition unit 40 acquires the location information of the determination target 500 (see FIG. 1). The location information acquisition unit 40 is, for example, the Global Positioning System (GPS). If the risk information provision device 100 is a portable computer such as a tablet, the location information acquisition unit 40 may be the GPS included in the computer. The location information acquisition unit 40 may acquire the location information of the risk information provision device 100.

The provision unit 18 may provide at least one of the risk information Ri or the risk handling information Ir based on the location information of the determination target 500 acquired by the location information acquisition unit 40. In this way, if the risk information Ri is, for example, the information indicating that the concentration of carbon dioxide ($CO_2$) 510 is rapidly approaching an abnormal value in the determination target 500, the provision unit 18 can provide the risk information Ri to the recipient 52-1 (a ventilation equipment company) that can solve the abnormal value and is closest to the current location of the determination target 500.

Figure 6:
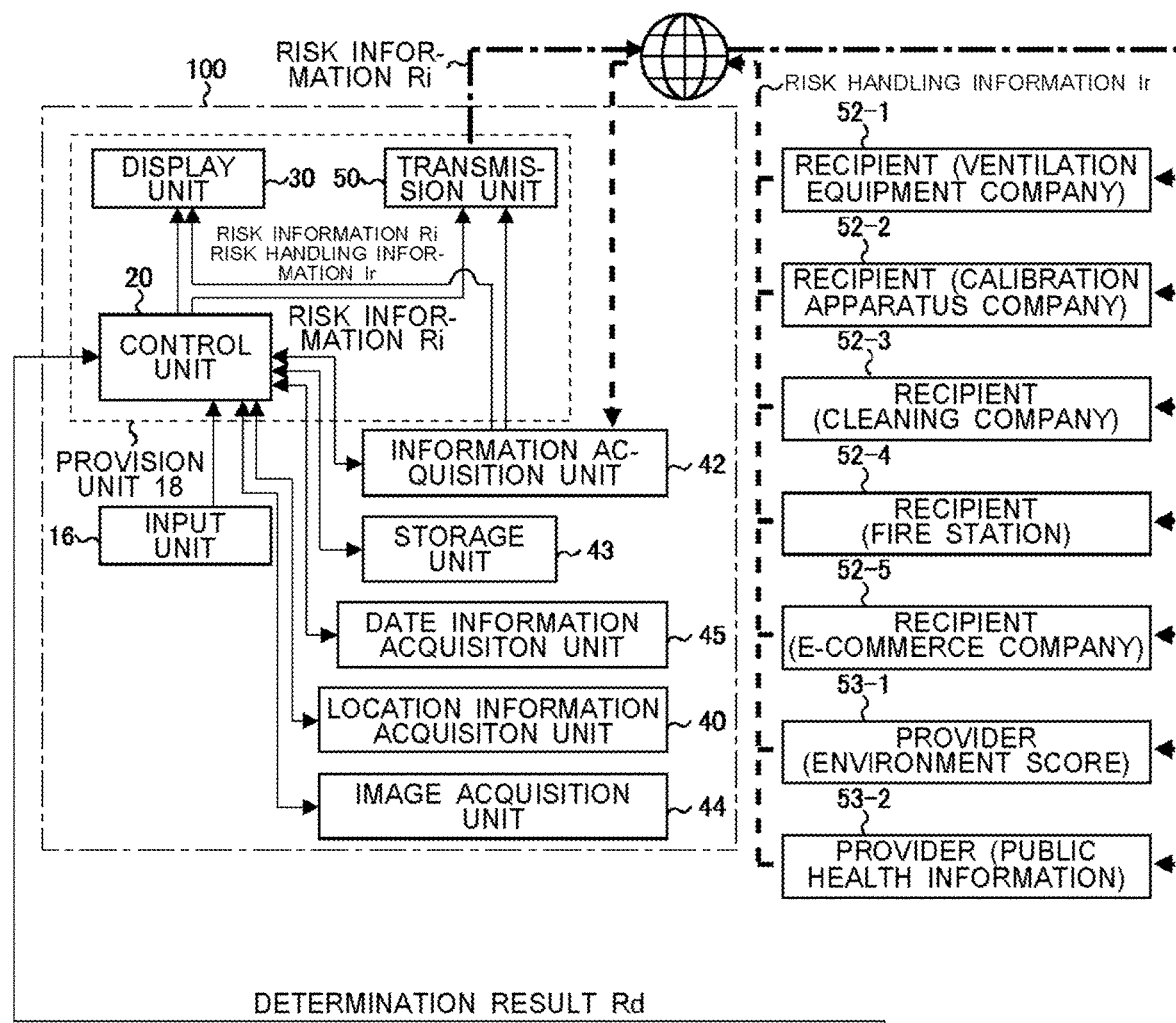
FIG. 6 is a block diagram showing another one example of the risk information provision system 200 according to one embodiment of the present invention.
Figure 6:
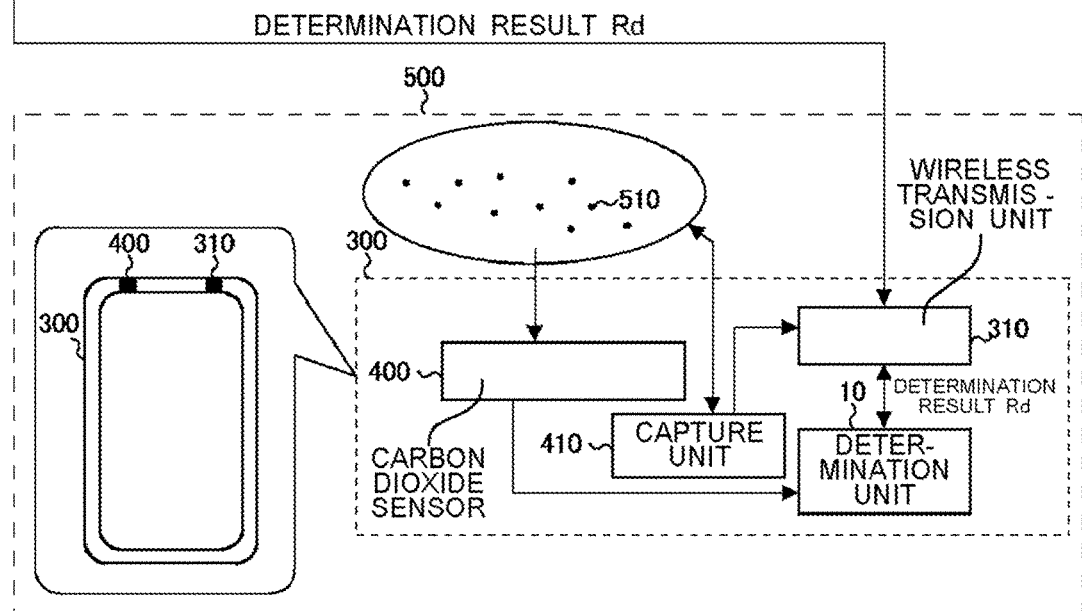

FIG. 6 is a block diagram showing another one example of the risk information provision system 200 according to one embodiment of the present invention. In this example, the risk information provision device 100 further includes the image acquisition unit 44. The risk information provision system 200 in this example is different from the risk information provision system 200 shown in FIG. 5 in these respects. The image acquisition unit 44 acquires the image of the determination target 500.

The mobile terminal 300 may include a capture unit 410 for capturing the image of the determination target 500. The capture unit 410 is, for example, a camera. If the mobile terminal 300 is a smartphone, the capture unit 410 may be a camera incorporated in the smartphone. The wireless transmission unit 310 may transmit, to the control unit 20, the image of the determination target 500 captured by the capture unit 410. The image acquisition unit 44 may acquire the image of the determination target 500 transmitted to the control unit 20.

The provision unit 18 may provide at least one of the risk information Ri or the risk handling information Ir based on the image acquired by the image acquisition unit 44. In this way, if the image acquired by the image acquisition unit 44 is, for example, the image of the apparatus that may cause a deviation from a regular release amount of carbon dioxide ($CO_2$) in the determination target 500, the provision unit 18 can provide the risk information Ri to the recipient 52-4 (a fire station) that is preferably informed of the danger due to the deviation. The apparatus that may cause a deviation from a regular release amount of carbon dioxide ($CO_2$) is, for example, a stove.

The control unit 20 may control the display unit 30 so that the display unit 30 displays at least one of the risk information Ri or the risk handling information Ir based on the image acquired by the image acquisition unit 44. If the image acquired by the image acquisition unit 44 is, for example, the image of the apparatus that may cause a deviation from a regular release amount of carbon dioxide ($CO_2$) in the determination target 500, the risk handling information Ir provided by the company that can alleviate the deviation, for example, at least one of the recipient 52-1 (a ventilation equipment company) or the recipient 52-5 (an electronic commerce company) may be displayed on the display unit 30. In this example, the risk handling information Ir is the advertisement information of the ventilation equipment company, the advertisement information of the electronic commerce company, and the like. In this way, the risk information provision device 100 easily prompts the user viewing the display unit 30 to handle the risk based on the risk handling information Ir.

The provision unit 18 may provide at least one of the risk information Ri or the risk handling information Ir based on the image acquired by the image acquisition unit 44 and the location information of the determination target 500 acquired by the location information acquisition unit 40. In this way, if the image acquired by the image acquisition unit 44 is, for example, the image of the apparatus that may cause a deviation from a regular release amount of carbon dioxide ($CO_2$) in the determination target 500, the provision unit 18 can provide the risk information Ri to the recipient 52-4 (a fire station) that is preferably informed of the danger due to the deviation and is closest to the current location of the risk information provision device 100.

The control unit 20 may control the display unit 30 so that the display unit 30 displays at least one of the risk information Ri or the risk handling information Ir based on the image acquired by the image acquisition unit 44 and the location information of the determination target 500 acquired by the location information acquisition unit 40. If the image acquired by the image acquisition unit 44 is, for example, the image of the apparatus that may cause a deviation from a regular release amount of carbon dioxide ($CO_2$) in the determination target 500, the display unit 30 may display the risk handling information Ir (for example, an advertisement) provided by a company that can alleviate the deviation, for example, the recipient 52 that is closest to the current location of the risk information provision device 100 and is at least one of the recipient 52-1 (a ventilation equipment company) or the recipient 52-5 (an electronic commerce company).

Figure 7:
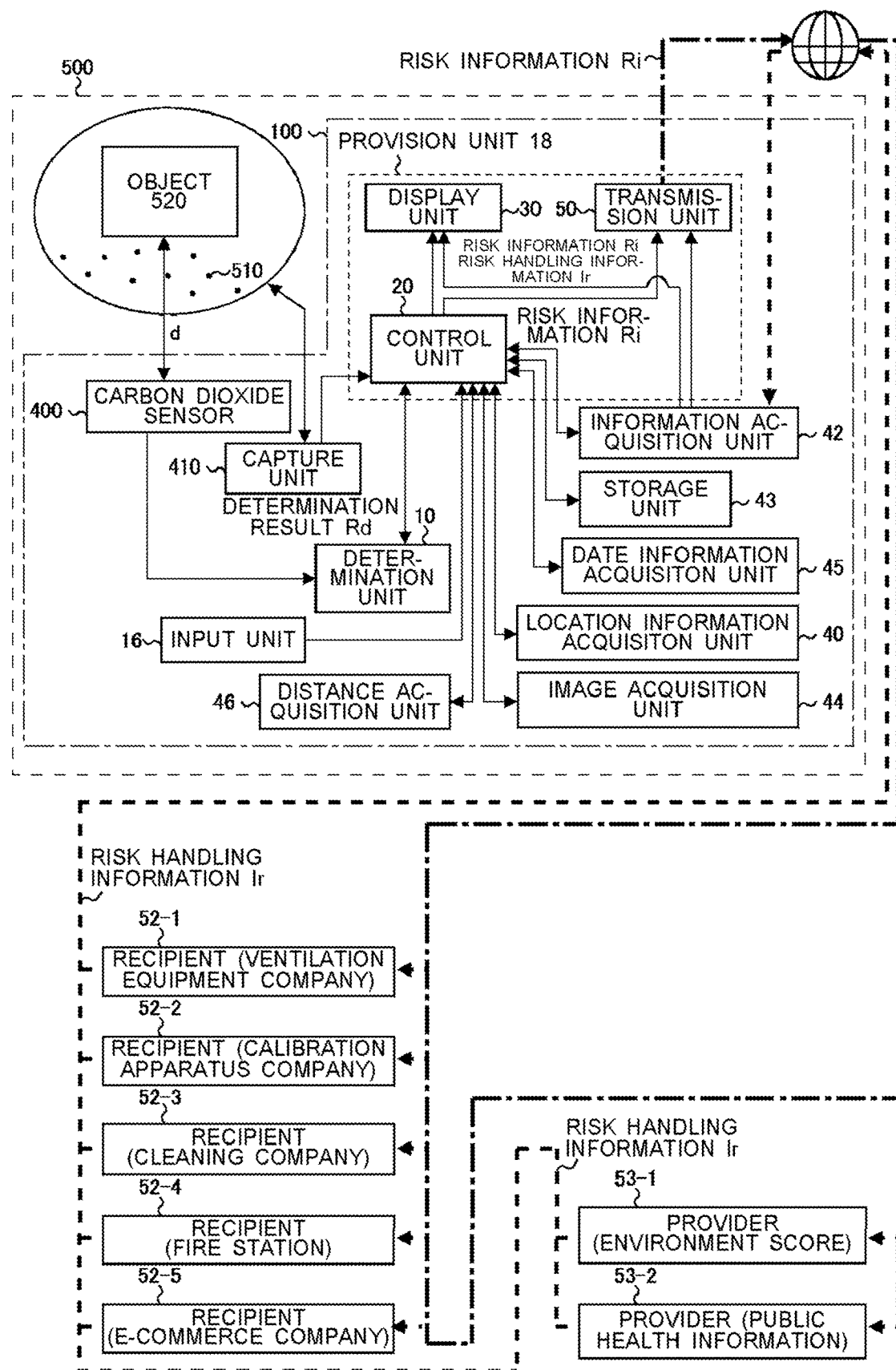
FIG. 7 is a block diagram showing one example of the risk information provision device 100 according to one embodiment of the present invention.

FIG. 7 is a block diagram showing one example of the risk information provision device 100 according to one embodiment of the present invention. In this example, the risk information provision device 100 includes a carbon dioxide ($CO_2$) sensor 400. In this example, the risk information provision device 100 further includes a distance acquisition unit 46. The distance acquisition unit 46 acquires the distance between the carbon dioxide ($CO_2$) sensor 400 and the object 520. In this example, the distance acquisition unit 46 acquires the distance between the carbon dioxide ($CO_2$) sensor 400 and the object 520 based on the image acquired by the image acquisition unit 44. The distance is referred to as distance d. It should be noted that, if the distance acquisition unit 46 acquires the distance d without based on the image acquired by the image acquisition unit 44, the distance acquisition unit 46 may acquire the distance d with an electro-optical distance measuring instrument or Light Detection and Ranging (LiDAR).

The risk information provision device 100 may include the capture unit 410 for capturing the image of the determination target 500. The capture unit 410 is, for example, a camera. If the risk information provision device 100 is a computer such as a tablet, the capture unit 410 may be a camera incorporated in the computer. The image acquisition unit 44 may acquire the image of the determination target 500 captured by the capture unit 410.

In this example, the risk information provision device 100 includes a determination unit 10. In this example, the determination unit 10 determines the status Sd of the carbon dioxide ($CO_2$) concentration in the determination target 500 based on the temporal change in the carbon dioxide ($CO_2$) concentration in the determination target 500. The determination unit 10 may output the determination result Rd. The determination unit 10 may be a central processing unit (CPU). The determination unit 10 and the control unit 20 may be one CPU.

The object 520 is a structural body that is in the determination target 500 and may have an effect on the status Sd of the carbon dioxide ($CO_2$) concentration in the determination target 500. The structural body is, for example, a building. The object 520 may be a wall, a floor, a ceiling, a window, or a door of the structural body or a living body. The living body may be a human body or may be an animal body.

If the distance d acquired by the distance acquisition unit 46 is less than a predetermined distance, the provision unit 18 may provide at least one of the risk information Ri or the risk handling information Ir. If the distance d is less than a predetermined distance, the control unit 20 may control the display unit 30 so that the display unit 30 displays the risk information Ri. The risk information Ri is, for example, the warning information indicating that the concentration of carbon dioxide ($CO_2$) 510 is rapidly approaching an abnormal value.

If the object 520 is, for example, a wall, the carbon dioxide ($CO_2$) 510 is likely to remain in the range less than a predetermined distance from the object 520. If the distance d between the carbon dioxide ($CO_2$) sensor 400 and the object 520 (wall) is less than the predetermined distance, the display unit 30 may display the risk information Ri. The risk information Ri is, for example, the warning information indicating the high probability of the concentration of carbon dioxide ($CO_2$) 510 being an abnormal value in the vicinity of the object 520 (a wall in this example). The distance d that is less than a predetermined distance is the distance d that is, for example, less than 50 cm.

If the object 520 is, for example, a window or a door, it is highly probable that two spaces with different concentrations of carbon dioxide ($CO_2$) 510 are in communication with each other through the window or the door. Therefore, in the range that is less than a predetermined distance from the object 520 (a window or door), the concentration of carbon dioxide ($CO_2$) 510 is likely to change. If the distance d between the carbon dioxide ($CO_2$) sensor 400 and the object 520 (a window or a door) is less than the predetermined distance, the display unit 30 may display the risk information Ri. The risk information Ri is, for example, the warning information indicating the high probability of the concentration of the carbon dioxide ($CO_2$) 510 being rapidly changing in the vicinity of the object 520 (in this example, a door). The distance d that is less than a predetermined distance is the distance d that is, for example, less than 1.5 m.

If the object 520 is, for example, a living body, the concentration of carbon dioxide ($CO_2$) 510, which is released by the living body during breathing, is likely to be higher in the range less than a predetermined distance from the object 520 (a living body) than in the range more than the predetermined distance. If the distance d between the carbon dioxide ($CO_2$) sensor 400 and the object 520 (a living body) is less than the predetermined distance, the display unit 30 may display the risk information Ri. The risk information Ri is, for example, the warning information indicating that the distance d between the carbon dioxide ($CO_2$) sensor 400 and the object 520 (a living body in this example) is too short. The distance d less than a predetermined distance is, for example, the distance d less than 1 m from the object 520 (a living body). The distance d less than a predetermined distance may be the distance d less than 2 m from the front of the object 520 (a living body) or less than 1 m from the side of the object 520 (a living body). In a case where the living body is a human, the front of the living body refers to the orientation that has a lateral symmetry with the spine being the center line. The side of the living body refers to the orientation of the living body that is rotated 90 degrees leftward or rightward with respect to the front with the spine being the center line.

Figure 8:
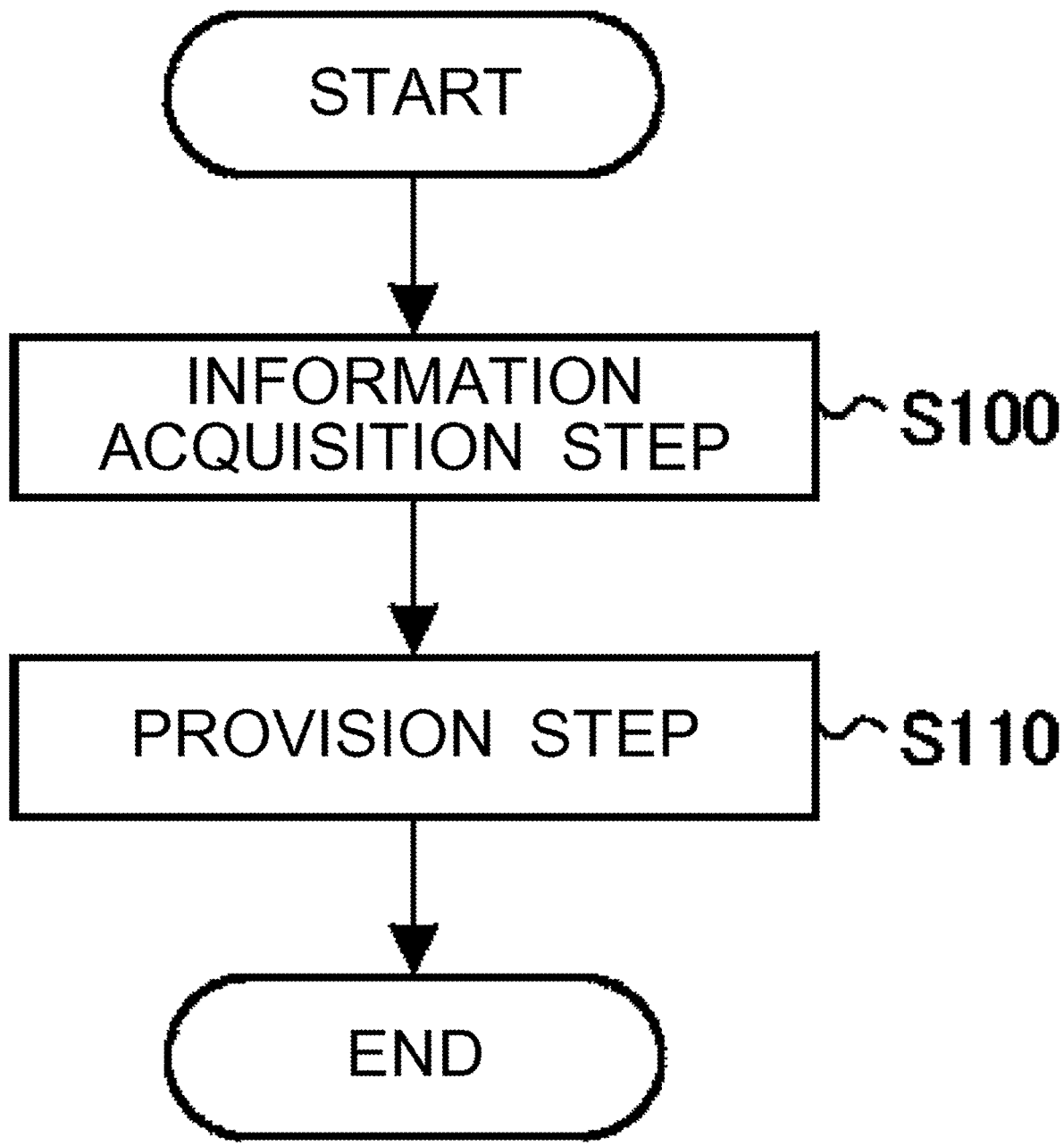
FIG. 8 is a flowchart showing one example of the risk information provision method according to one embodiment of the present invention.

FIG. 8 is a flowchart showing one example of the risk information provision method according to one embodiment of the present invention. The risk information provision method according to one embodiment of the present invention is described with reference to the risk information provision system 200 shown in FIG. 1 as an example. The information acquisition step S100 is a step of acquiring, by the information acquisition unit 42, the risk information Ri related to the risk depending on the status Sd of the concentration of carbon dioxide ($CO_2$) 510 in the determination target 500 and the risk handling information Ir for handling the risk. The status Sd is determined based on the temporal change in the concentration of carbon dioxide ($CO_2$) 510 in the determination target 500. The provision step S110 is a step of providing, by the provision unit 18, the risk information Ri and the risk handling information Ir.

The provision step S110 may be a step of controlling, by the control unit 20, the display unit 30 so that the display unit 30 displays at least one of the risk information Ri or the risk handling information Ir. In this way, the user of the risk information provision method can know at least one of the risk information Ri or the risk handling information Ir.

The provision step S110 may be a step of controlling, by the control unit 20, the transmission unit 50 so that the transmission unit 50 transmits the risk information Ri. The risk information Ri may be transmitted to the recipient 52 via the Internet line. In this way, the recipient 52 can know the risk information Ri.

The provision step S110 may be a step of, in a case where at least one of the additional risk information Ria or the additional risk handling information Ira is input, providing, by the provision unit 18, at least one of the risk information Ri or the risk handling information Ir based on at least one of the additional risk information Ria or the additional risk handling information Ira. As described above, the additional risk information Ria may be the risk information realized by the user of the risk information provision device 100 besides the status Sd determined based on the temporal change in the concentration of carbon dioxide ($CO_2$) 510. The additional risk handling information Ira may be the risk handling information realized by the user of the risk information provision device 100 besides the risk handling information Ir acquired by the information acquisition unit 42, as described above.

The risk handling information Ir may include recipient information Isp related to a recipient to which the risk information Ri is provided. The provision step S110 is a step of, in a case where the input unit 16 has input the handling of the risk based on the risk handling information Ir, providing, by the provision unit 18, the risk information Ri to the recipient 52. Inputting the handling of the risk based on the risk handling information Ir refers to, in a case where the risk handling information Ir is the advertisement information provided by the recipient 52-1 (a ventilation equipment company), inputting the request for ventilation to the recipient 52-1 in order to solve the risk (for example, the abnormal value of carbon dioxide ($CO_2$) concentration).

Figure 9:
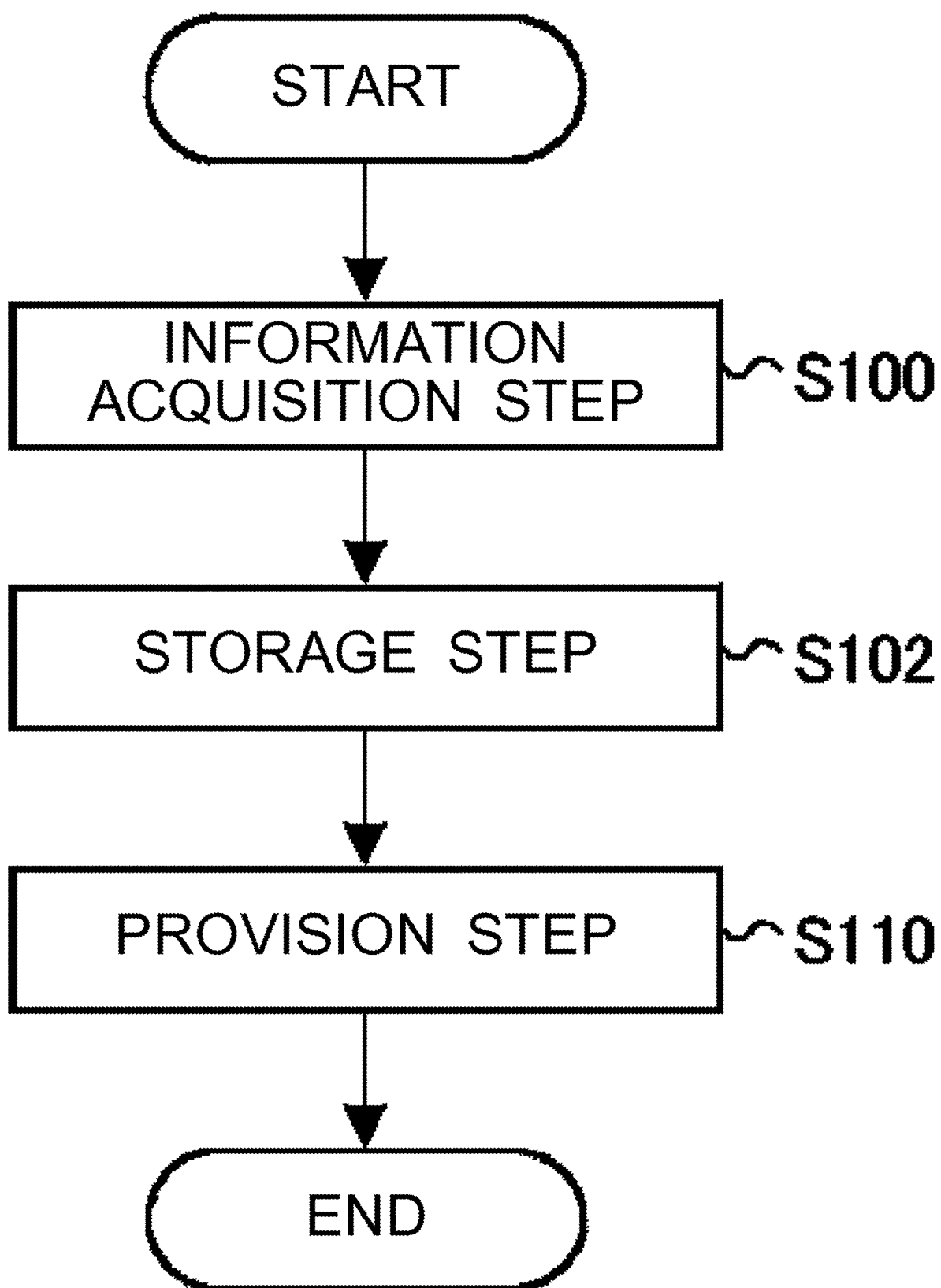
FIG. 9 is a flowchart showing another one example of the risk information provision method according to one embodiment of the present invention.

FIG. 9 is a flowchart showing another one example of the risk information provision method according to one embodiment of the present invention. The risk information provision method in this example is different from the risk information provision method shown in FIG. 8 in that it further includes a storage step S102. The risk information provision method shown in FIG. 9 is described with reference to the risk information provision system 200 shown in FIG. 3 as an example.

The storage step S102 is a step of storing, by the storage unit 43, the provision history of the risk information Ri and the risk handling information Ir provided by the provision unit 18. In this example, the provision step S110 is a step of providing, by the provision unit 18, at least one of the risk information Ri or the risk handling information Ir based on the provision history of the risk information Ri and the risk handling information Ir that is stored in the storage step S102.

For the risk information provision method in this example, the provision step S110 is likely to provide the risk handling information Ir and the risk information Ri having a high probability of being most appropriate, because the risk handling information Ir is provided based on the provision history of the risk information Ri and the risk handling information Ir.

The risk handling information Ir may include the information related to the apparatus Ap for handling the risk. As described above, the apparatus Ap for handling the risk is, for example, in a case where the concentration of carbon dioxide ($CO_2$) 510 (see FIG. 1) in the determination target 500 is approaching an abnormal value, a ventilation apparatus for solving the abnormal value.

The information acquisition step S100 may be a step of further acquiring, by the information acquisition unit 42, the information related to the apparatus Ap provided by the recipient 52 (see FIG. 3). The storage step S102 may be a step of further storing the acquisition history of the information related to the apparatus Ap acquired by the information acquisition unit 42. The provision step S110 may be a step of providing, by the provision unit 18, at least one of the risk information Ri or the risk handling information Jr based on the acquisition history of the information relate the apparatus Ap stored in the storage step S102.

For the risk information provision method in this example, the provision step S110 is likely to provide the risk handling information Ir and the risk information Ri having a high probability of being most appropriate, because at least one of the risk information Ri or the risk handling information Ir is provided based on the acquisition history of the information related to the apparatus Ap.

The storage step S102 may be a step of further storing, by the storage unit 43, the browsing history of the information related to the apparatus Ap acquired by the information acquisition unit 42. In this way, the provision step S110 is likely to provide at least one of the risk information Ri or the risk handling information Ir based on the browsing history of the information related to the apparatus Ap.

Figure 10:
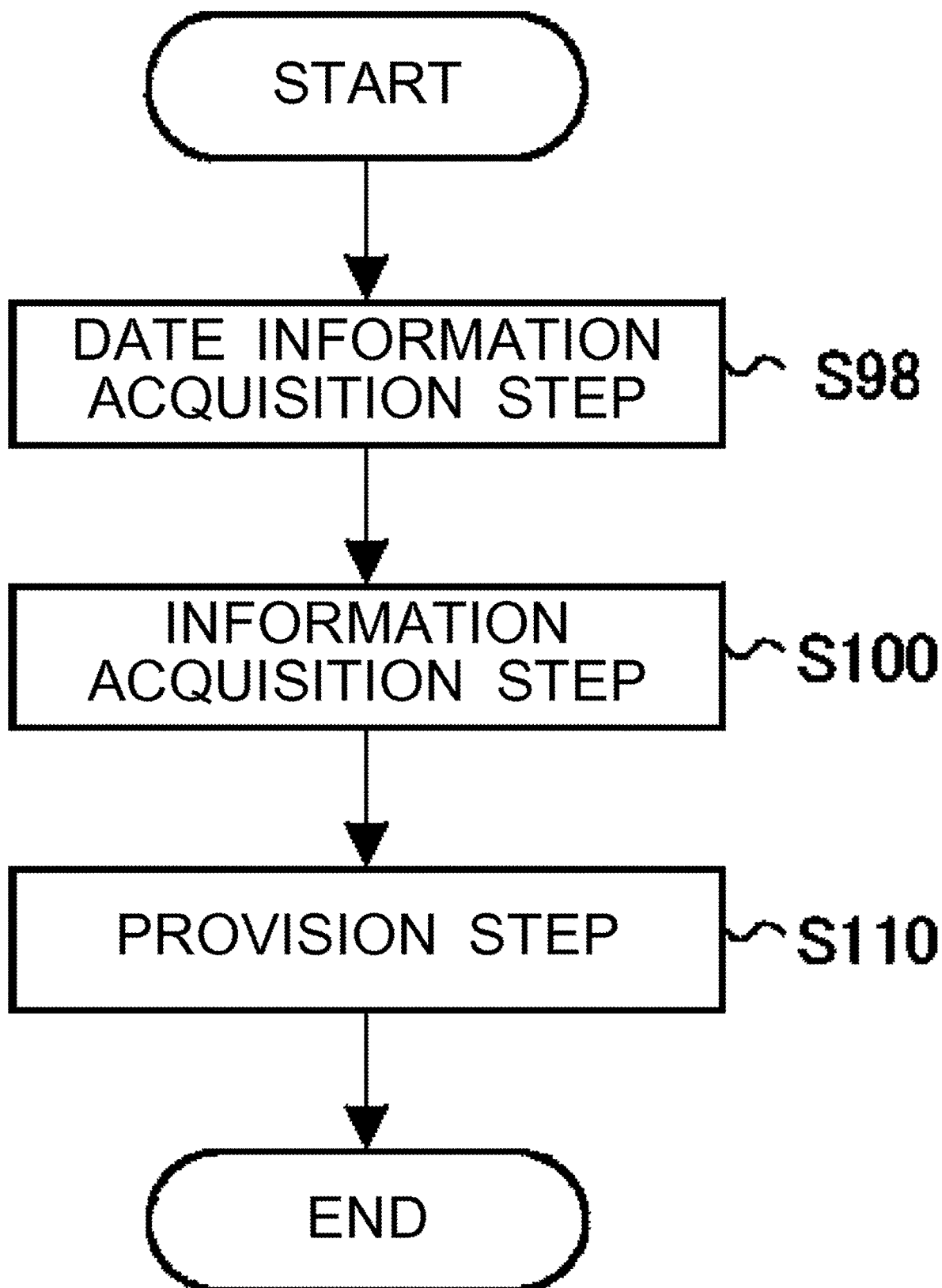
FIG. 10 is a flowchart showing another one example of the risk information provision method according to one embodiment of the present invention.

FIG. 10 is a flowchart showing another one example of the risk information provision method according to one embodiment of the present invention. The risk information provision method in this example is different from the risk information provision method shown in FIG. 9 in that it further includes the date information acquisition step S98. The risk information provision method shown in FIG. 10 is described with reference to the risk information provision system 200 shown in FIG. 4 as an example.

The date information acquisition step S98 is a step of acquiring, by the date information acquisition unit 45, the date information Id of the date on which the risk information Ri and the risk handling information Ir are acquired. The date information Id is, for example, the year and date on which at least one of the risk information Ri or the risk handling information Ir is acquired.

The information acquisition step S100 may be a step of acquiring the risk information Ri and the risk handling information Ir based on the date information Id acquired in the date information acquisition step S98. The provision step S110 may be a step of providing the risk information Ri and the risk handling information Ir.

For the risk information provision method in this example, the risk information Ri and the risk handling information Ir are acquired based on the date information Id in the information acquisition step S100 and the risk information Ri and the risk handling information Ir are provided in the provision step S110. In this way, the risk information Ri and the risk handling information Ir reflecting the purchasing trends (for example, the seasonal characteristics) of the apparatus Ap by the user of the risk information provision device 100 is likely to be provided.

Figure 11:
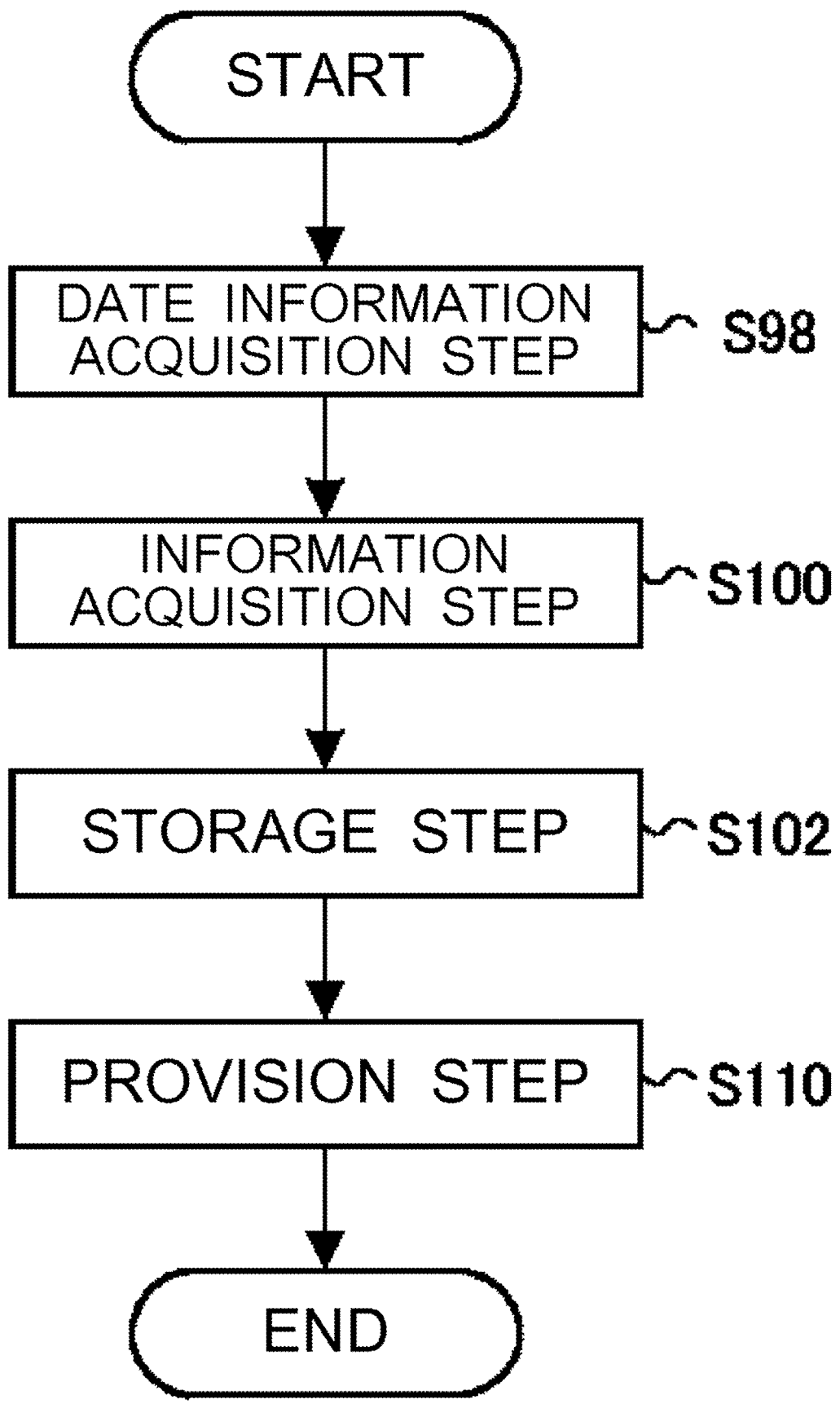
FIG. 11 is a flowchart showing another one example of the risk information provision method according to one embodiment of the present invention.

FIG. 11 is a flowchart showing another one example of the risk information provision method according to one embodiment of the present invention. The risk information provision method in this example is different from the risk information provision method shown in FIG. 10 in that it further includes a storage step S102. The risk information provision method shown in FIG. 11 is described with reference to the risk information provision system 200 shown in FIG. 4 as an example.

The storage step S102 may be a step of further storing the date information Id acquired in the date information acquisition step S98. The provision step S110 may be a step of providing, by the provision unit 18, at least one of the risk information Ri or the risk handling information Ir based on the date information Id stored in the storage step S102.

For the risk information provision method in this example, because at least one of the risk information Ri or the risk handling information Ir is provided based on the date information Id in the provision step S110, the risk information Ri is likely to be provided to the recipient 52 or the provider 53 (see FIG. 4) that is most appropriate for the user of the risk information provision device 100.

Figure 12:
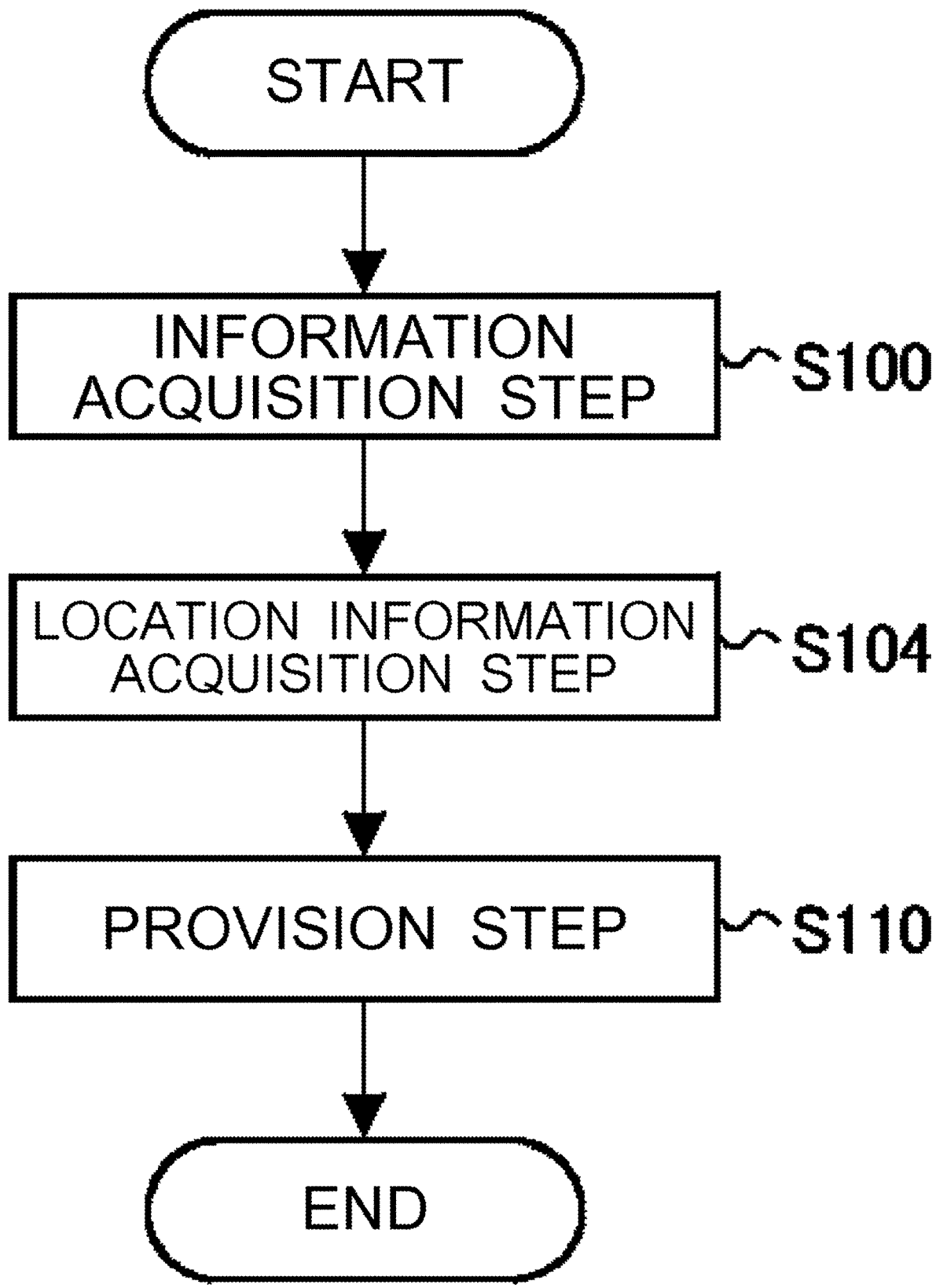
FIG. 12 is a flowchart showing another one example of the risk information provision method according to one embodiment of the present invention.

FIG. 12 is a flowchart showing another one example of the risk information provision method according to one embodiment of the present invention. The risk information provision method in this example is different from the risk information provision method shown in FIG. 8 in that it further includes the location information acquisition step S104. The risk information provision method shown in FIG. 12 is described with reference to the risk information provision system 200 shown in FIG. 5 as an example.

The location information acquisition step S104 is a step for acquiring, by the location information acquisition unit 40, the location information of the determination target 500. The provision step S110 may be a step of providing, by the provision unit 18, at least one of the risk information Ri or the risk handling information Ir based on the location information of the determination target 500.

For the risk information provision method in this example, the risk information Ri is provided based on the location information of the determination target 500 in the provision step S110. Therefore, if the risk information Ri depending on the status Sd is, for example, the risk information Ri depending on the status Sd indicating that the concentration of the carbon dioxide ($CO_2$) 510 is approaching an abnormal value, in the provision step S110, the risk information Ri is likely to be provided to the recipient 52-1 (a ventilation equipment company) that is closest to the current location of the determination target 500.

Figure 13:
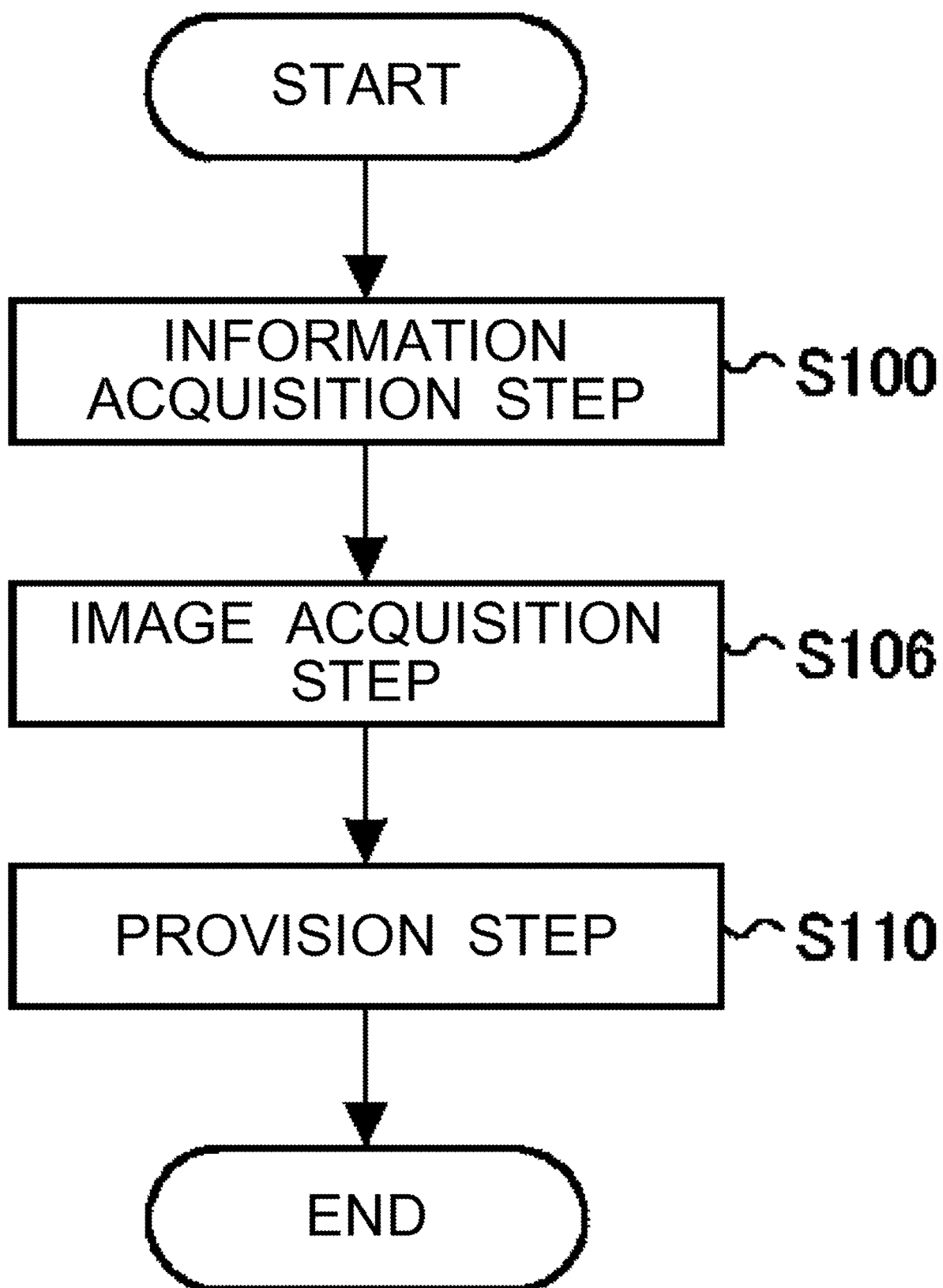
FIG. 13 is a flowchart showing another one example of the risk information provision method according to one embodiment of the present invention.

FIG. 13 is a flowchart showing another one example of the risk information provision method according to one embodiment of the present invention. The risk information provision method in this example is different from the risk information provision method shown in FIG. 8 in that it further includes the image acquisition step S106. The risk information provision method shown in FIG. 13 is described with reference to the risk information provision system 200 shown in FIG. 6 as an example.

The image acquisition step S106 is a step of acquiring, by the image acquisition unit 44, the image of the determination target 500. The provision step S110 may be a step of providing, by the provision unit 18, at least one of the risk information Ri or the risk handling information based on the image of the determination target 500 acquired in the image acquisition step S106.

For the risk information provision method in this example, the risk information Ri is provided based on the image of the determination target 500 in the provision step S110. In this way, if the image acquired in the image acquisition step S106 is, for example, the image of the apparatus that may cause a deviation from a regular release amount of carbon dioxide ($CO_2$) of the determination target 500, in the provision step S110, the risk information Ri is likely to be provided to the recipient 52-4 (a fire station) that is preferably informed of the danger due to the deviation. The apparatus that may cause the deviation from the regular release amount of carbon dioxide ($CO_2$) is, for example, a stove.

Figure 14:
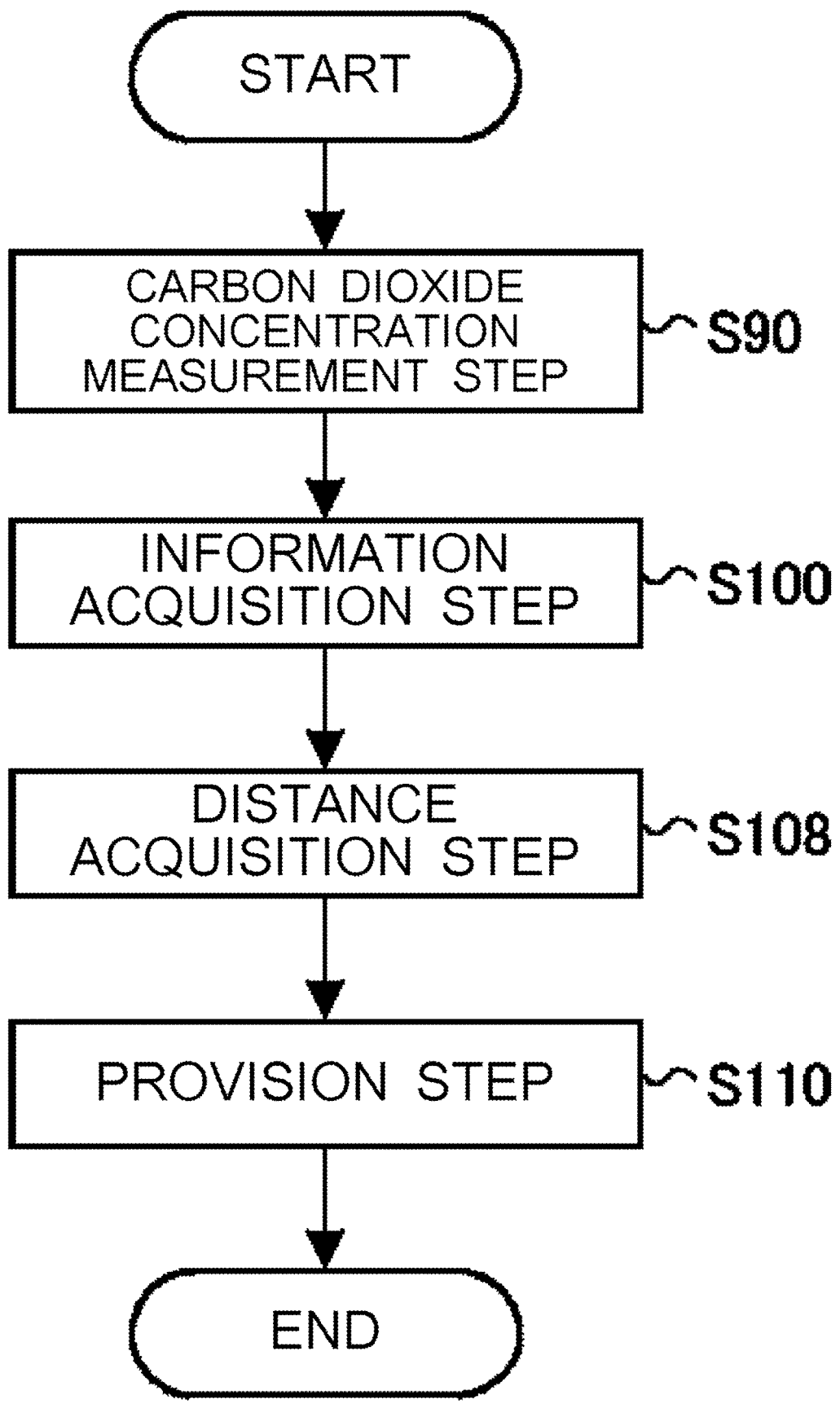
FIG. 14 is a flowchart showing another one example of the risk information provision method according to one embodiment of the present invention.

FIG. 14 is a flowchart showing another one example of the risk information provision method according to one embodiment of the present invention. The risk information provision method in this example is different from the risk information provision method shown in FIG. 8 in that it further includes the carbon dioxide concentration measurement step S90 and the distance acquisition step S108. The risk information provision method shown in FIG. 14 is described with reference to the risk information provision device 100 shown in FIG. 7 as an example.

The carbon dioxide concentration measurement step S90 is a step of measuring, by the carbon dioxide ($CO_2$) sensor 400, the concentration of carbon dioxide ($CO_2$) 510 in the determination target 500. The distance acquisition step S108 is a step of acquiring the distance d between the carbon dioxide ($CO_2$) sensor 400 and the object 520 (see FIG. 7). The distance acquisition step S108 may be a step of acquiring, by the distance acquisition unit 46, the distance between the carbon dioxide ($CO_2$) sensor 400 and the object 520 based on the image acquired in the image acquisition step S106. It should be noted that, if the distance acquisition unit 46 acquires the distance d without based on the image acquired by the image acquisition unit 44 in the distance acquisition step S107, the distance acquisition step S107 may be a step of acquiring, by the distance acquisition unit 46, the distance d using the electro-optical distance measuring instrument or the Light Detection and Ranging (LiDAR).

The object 520 is a structural body that is in the determination target 500 and may have an effect on the status Sd of the carbon dioxide ($CO_2$) concentration in the determination target 500. The structural body is, for example, a building. The object 520 may be a wall, a floor, a ceiling, a window, or a door of the structural body or a living body. The living body may be a human body, or may be a body of an animal.

The provision step S110 may be a step of, in a case where the distance d acquired in the distance acquisition step S108 is less than a predetermined distance, providing, by the provision unit 18, the risk information Ri and the risk handling information Ir. If the object 520 is, for example, a wall, the carbon dioxide ($CO_2$) 510 is likely to remain in the range less than a predetermined distance from the object 520. If the distance d between the carbon dioxide ($CO_2$) sensor 400 and the object 520 (a wall) is less than the predetermined distance, in the provision step S110, the risk information Ri may be displayed on the display unit 30. The risk information Ri is, for example, the warning information indicating the high probability of the concentration of carbon dioxide ($CO_2$) 510 being an abnormal value in the vicinity of the object 520 (a wall in this example).

Various embodiments of the present invention may be described with reference to a flowchart and a block diagram. According to the various embodiments of the present invention, a block may represent (1) a step of a process where operations are executed or (2) a section of an apparatus having a role for executing operations.

A specific step may be executed by a dedicated circuit, a programmable circuit, or a processor. A specific section may be implemented by a dedicated circuit, a programmable circuit, or a processor. The programmable circuit and the processor may be supplied together with a computer-readable instruction. The computer-readable instruction may be stored on a computer-readable medium.

The dedicated circuit may include at least one of a digital hardware circuit and an analog hardware circuit. The dedicated circuit may include at least one of an integrated circuit (IC) and a discrete circuit. The programmable circuit may a hardware circuit including include logical AND, logical OR, logical XOR, logical NAND, logical NOR, and other logical operations. The programmable circuit may include a reconfigurable hardware circuit including a flip-flop, a register, a memory element such as a field programmable gate array (FPGA) and a programmable logic array (PLA), and the like.

The computer-readable medium may include any tangible device that can store an instruction to be executed by an appropriate device. Since the computer-readable medium includes the tangible device, the computer-readable medium having the instruction stored on the device constitutes a product including an instruction that may be executed in order to provide means to execute an operation specified by a flowchart or a block diagram.

The computer-readable medium may be, for example, an electronic storage medium, a magnetic storage medium, an optical storage medium, an electromagnetic storage medium, a semiconductor storage medium, or the like. More specifically, for example, the computer-readable medium may be a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include any of an assembler instruction, an instruction-set-architecture (ISA) instruction, a machine instruction, a machine dependent instruction, a microcode, a firmware instruction, state-setting data, a source code, and an object code. The source code and the object code may be written in any combination of one or more programming languages including an object oriented programming language and a procedural programming language in related art. The object oriented programming language may be, for example, Smalltalk (registered trademark), JAVA (registered trademark), C++, or the like. The procedural programming language may be, for example, a "C" programming language.

The computer-readable instruction may be provided to a general purpose computer, a special purpose computer, or a processor or a programmable circuit of another programmable data processing apparatus locally or via a local area network (LAN) or a wide area network (WAN) such as the Internet. The processor or programmable circuit of a general purpose computer, a special purpose computer, or another programmable data processing apparatus may execute a computer-readable instruction in order to make means for performing the operation specified in the flowchart shown in FIG. 8 to FIG. 14 or the block diagram shown in FIG. 1 to FIG. 7. The processor may be, for example, a computer processor, a processing unit, a microprocessor, a digital signal processor, a controller, a microcontroller, or the like.

Figure 15:
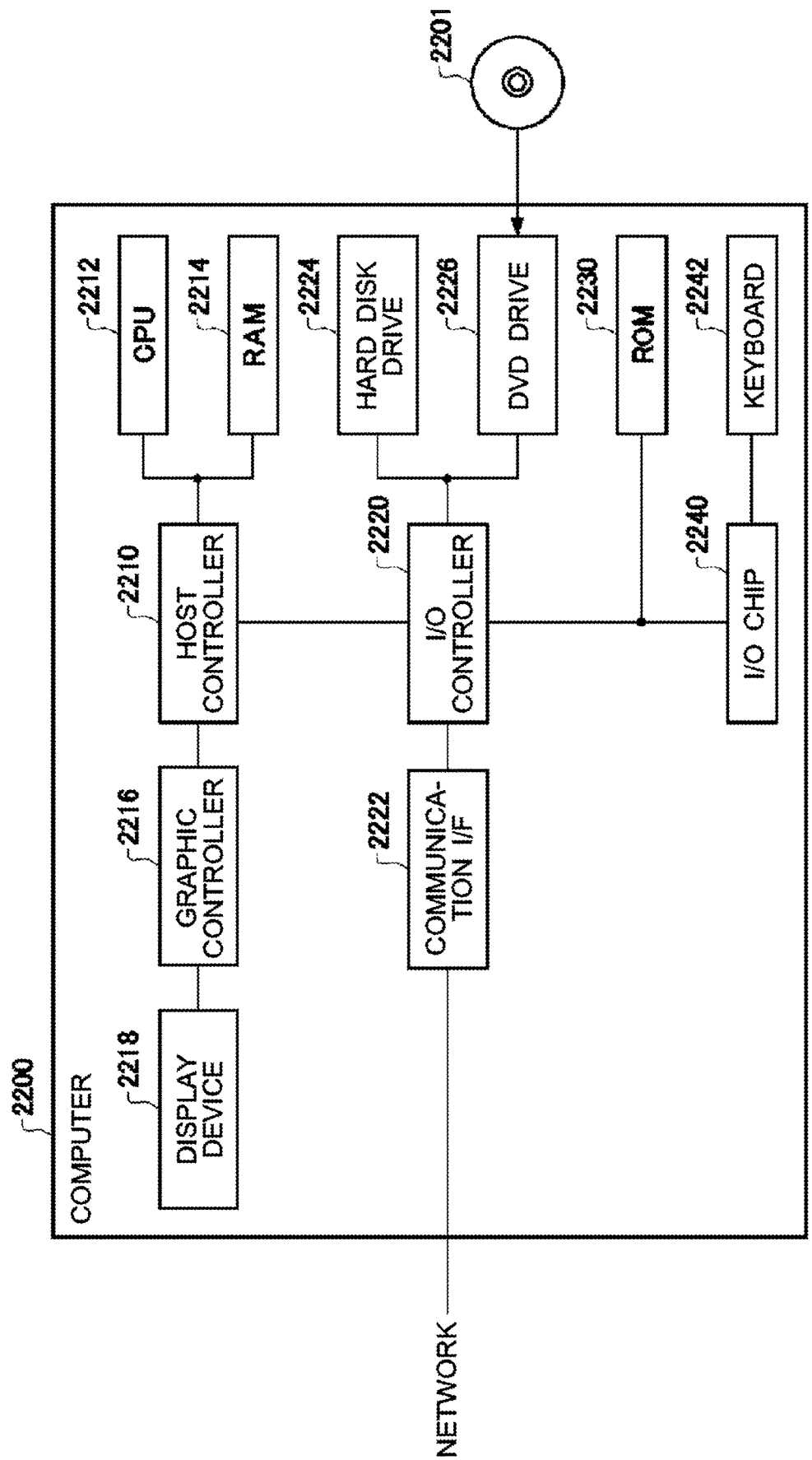
FIG. 15 is a diagram showing one example of a computer 2200 in which the risk information provision device 100 according to one embodiment of the present invention may be entirely or partially embodied.

FIG. 15 is a diagram showing one example of the computer 2200 in which the risk information provision device 100 according to one embodiment of the present invention may be entirely or partially embodied. The program installed in the computer 2200 can cause the computer 2200 to function as the operation associated with the risk information provision device 100 according to an embodiment of the present invention or one or more sections of the risk information provision device 100, or to perform the operation or the one or more section, or cause the computer 2200 to perform each step according to the risk information provision method of the present invention (see FIG. 8 to FIG. 14). The program may be performed by the CPU 2212 in order to cause the computer 2200 to perform a particular operation associated with some or all of the blocks in the flowchart (FIG. 8 to FIG. 14) and the block diagram (FIG. 1 to FIG. 7) described in this specification.

The computer 2200 according to one embodiment of the present invention includes a CPU 2212, an RAM 2214, a graphics controller 2216, and a display device 2218. The CPU 2212, the RAM 2214, the graphics controller 2216, and the display device 2218 are mutually connected by a host controller 2210. The computer 2200 further includes an input/output unit such as a communication interface 2222, a hard disk drive 2224, a DVD-ROM drive 2226, and an IC card drive. The communication interface 2222, the hard disk drive 2224, the DVD-ROM drive 2226, and the IC card drive, and the like are connected to the host controller 2210 via an input/output controller 2220. The computer further includes a legacy input/output unit such as a ROM 2230 and a keyboard 2242. The ROM 2230, the keyboard 2242, and the like are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in the RAM 2214 itself to cause the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the read programs or data to the hard disk drive 2224 via the RAM 2214. The IC card drive reads programs and data from an IC card, or writes programs and data to the IC card.

The ROM 2230 stores a boot program or the like executed by the computer 2200 at the time of activation, or a program depending on the hardware of the computer 2200. The input/output chip 2240 may connect various input/output unit via a parallel port, a serial port, a keyboard port, a mouse port, or the like to the input/output controller 2220.

A program is provided by computer-readable media such as the DVD-ROM 2201 or the IC card. The program is read from the computer-readable media, installed into the hard disk drive 2224, RAM 2214, or ROM 2230, which are also examples of computer-readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when a communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

The CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, or the like. The CPU 2212 may perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search or replace of information, or the like, as described throughout the present disclosure and designated by an instruction sequence of programs. The CPU 2212 may write the result back to the RAM 2214.

The CPU 2212 may search for information in a file, a database, or the like in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, read the attribute value of the second attribute stored in the entry, and read a second attribute value to obtain the attribute value of the second attribute associated with the first attribute satisfying the predetermined condition.

The above-explained program or software modules may be stored in the computer-readable media on the computer 2200 or of the computer 2200. A recording medium such as a hard disk or a RAM provided in a server system connected to a dedicated communication network or the Internet can be used as the computer-readable media. The program may be provided to the computer 2200 by the recording medium.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 determination unit
16 input unit
18 provision unit
20 control unit
30 display unit
32 voice output unit
40 location information acquisition unit
42 information acquisition unit
43 storage unit
44 image acquisition unit
45 date information acquisition unit
46 distance acquisition unit
50 transmission unit
52 recipient
53 provider
100 risk information provision device
200 risk information provision system
300 mobile terminal
310 wireless transmission unit
400 carbon dioxide ($CO_2$) sensor
410 capture unit
500 determination target
510 carbon dioxide ($CO_2$)
520 object
2200 computer
2201 DVD-ROM
2210 host controller
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboard

What is claimed is:

1. A risk information provision device comprising:
an information acquisition unit for acquiring risk information related to human health risks associated with a status of a concentration of carbon dioxide in an indoor room and risk handling information for handling the human health risks, wherein the status of the concentration of the carbon dioxide is determined based on a temporal change in the concentration of the carbon dioxide in the indoor room; and
a provision unit for providing at least one of the risk information or the risk handling information,
wherein the risk handling information includes recipient information related to a recipient to which the risk information is provided and public health information regarding safe levels of indoor concentration of the carbon dioxide and advertisement information for solving an abnormal value in the concentration of the carbon dioxide in the indoor room, and
the provision unit is configured to provide the risk information to the recipient.

2. The risk information provision device according to claim 1, further comprising an input unit for receiving information from an external source,
wherein in response to the input unit receiving, from the external source, at least one of additional risk information indicating an abnormality of the determination target or additional risk handling information related to handling the abnormality of the determination target, the provision unit provides, to the recipient, the at least one of the risk information or the risk handling information based on the at least one of the additional risk information or the additional risk handling information.

3. The risk information provision device according to claim 1, further comprising an input unit,
wherein if the input unit inputs handling of the risk based on the risk handling information to the provision unit, the provision unit provides the risk information to the recipient.

4. The risk information provision device according to claim 2, further comprising a storage unit for storing a provision history of the risk information and the risk handling information provided by the provision unit,
wherein the provision unit is configured to provide at least one of the risk information or the risk handling information based on the provision history of the risk information and the risk handling information that is stored in the storage unit.

5. The risk information provision device according to claim 4,
wherein the risk handling information includes information related to an apparatus for handling the risk,
the information acquisition unit is configured to further acquire information related to the apparatus provided by the recipient,
the storage unit is configured to further store an acquisition history of information related to the apparatus acquired by the information acquisition unit,
the provision unit is configured to provide at least one of the risk information or the risk handling information based on the acquisition history of information related to the apparatus that is stored in the storage unit.

6. The risk information provision device according to claim 4, further comprising a date information acquisition unit for acquiring date information of a date on which at least one of the risk information or the risk handling information is acquired,
wherein the storage unit is configured to further store the date information acquired by the date information acquisition unit, and
the provision unit is configured to provide at least one of the risk information or the risk handling information based on the date information stored in the storage unit.

7. The risk information provision device according to claim 1, further comprising a date information acquisition unit for acquiring date information of a date on which at least one of the risk information or the risk handling information is acquired,
wherein the information acquisition unit is configured to acquire the risk information and the risk handling information based on the date information acquired by the date information acquisition unit.

8. The risk information provision device according to claim 1, further comprising a location information acquisition unit for acquiring location information of the determination target, wherein the provision unit is configured to provide at least one of the risk information or the risk handling information based on the location information of the determination target.

9. The risk information provision device according to claim 1, further comprising:
a carbon dioxide sensor for measuring the concentration of the carbon dioxide in the determination target; and
a distance acquisition unit for acquiring a distance between the carbon dioxide sensor and an object,
wherein the provision unit is configured to provide at least one of the risk information or the risk handling information if the distance acquired by the distance acquisition unit is less than a predetermined distance.

10. A risk information provision system comprising:
the risk information provision device according to claim 1; and
a mobile terminal including a carbon dioxide sensor for measuring the concentration of the carbon dioxide in the determination target.

11. A risk information provision method comprising:
acquiring, by an information acquisition unit, risk information related to human health risks associated with a status of a concentration of carbon dioxide in an indoor room and risk handling information for handling the human health risks, wherein the status of the concentration of the carbon dioxide is determined based on a temporal change in the concentration of the carbon dioxide in the indoor room; and
providing, by a provision unit, at least one of the risk information or the risk handling information,
wherein the risk handling information includes recipient information related to a recipient to which the risk information is provided and public health information regarding safe levels of indoor concentration of the carbon dioxide and advertisement information for solving an abnormal value in the concentration of the carbon dioxide in the indoor room, and
the providing is providing the risk information to the recipient.

12. The risk information provision method according to claim 11, wherein the providing is, in response to at least one of additional risk information indicating an abnormality of the determination target or additional risk handling information for handling the abnormality of the determination target is input from an external source, providing to the recipient, by the provision unit, the at least one of the risk information or the risk handling information based on the at least one of the additional risk information or the additional risk handling information.

13. The risk information provision method according to claim 11,
wherein the providing is, if handling of the risk based on the risk handling information is input by an input unit, providing, by the provision unit, the risk information to the recipient.

14. The risk information provision method according to claim 12, further comprising storing, by a storage unit, a provision history of the risk information and the risk handling information provided by the provision unit, and
the providing is providing, by the provision unit, at least one of the risk information or the risk handling information based on the provision history of the risk information and the risk handling information that is stored during the storing.

15. The risk information provision method according to claim 14,
wherein the risk handling information includes information related to an apparatus for handling the risk,
the acquiring information is further acquiring, by the information acquisition unit, information related to the apparatus and provided by the recipient,
the storing is further storing an acquisition history of the information related to the apparatus and acquired by the information acquisition unit, and
the providing is providing, by the provision unit, at least one of the risk information or the risk handling information based on the acquisition history of the information related to the apparatus and stored in the storage unit.

16. The risk information provision method according to claim 14, further comprising acquiring, by a date information acquisition unit, date information of a date on which the risk information and the risk handling information are acquired,
the storing is further storing the date information acquired by the date information acquisition unit, and
the providing is providing, by the provision unit, at least one of the risk information or the risk handling information based on the date information stored in the storage unit.

17. The risk information provision method according to claim 11, further comprising acquiring, by a date information acquisition unit, date information of a date on which the risk information and the risk handling information are acquired,
wherein the acquiring the date information is acquiring the risk information and the risk handling information based on the date information acquired by the date information acquisition unit.

18. The risk information provision method according to claim 11, further comprising acquiring, by a location information acquisition unit, location information of the determination target,
wherein the providing is providing, by the provision unit, at least one of the risk information or the risk handling information based on the location information of the determination target.

19. A non-transitory computer-readable medium having recorded thereon a program that, when executed by a computer, causes the computer to perform operations comprising:
acquiring risk information related to human health risks associated with a status of a concentration of carbon dioxide in an indoor room and risk handling information for handling the human health risks, wherein the status of the concentration of the carbon dioxide is determined based on a temporal change in the concentration of the carbon dioxide in the indoor room; and
providing the risk information and the risk handling information,
wherein the risk handling information includes recipient information related to a recipient to which the risk information is provided and public health information regarding safe levels of indoor concentration of the carbon dioxide and advertisement information for solving an abnormal value in the concentration of the carbon dioxide in the indoor room, and
the providing is providing the risk information to the recipient.

20. The risk information provision device according to claim 1, wherein the public health information is information of laws related to the public health.

* * * * *